(12) United States Patent
Hashimoto et al.

(10) Patent No.: US 8,097,337 B2
(45) Date of Patent: Jan. 17, 2012

(54) STRUCTURE AND MANUFACTURING METHOD OF THE SAME

(75) Inventors: Tomohiro Hashimoto, Kanagawa-ken (JP); Hiroaki Misawa, Hokkaido (JP)

(73) Assignees: Ohara Inc. (JP); National University Corporation Hokkaido University (JP)

( * ) Notice: Subject to any disclaimer, the term of this patent is extended or adjusted under 35 U.S.C. 154(b) by 770 days.

(21) Appl. No.: 11/990,470

(22) PCT Filed: Aug. 15, 2006

(86) PCT No.: PCT/JP2006/316286
§ 371 (c)(1),
(2), (4) Date: Feb. 14, 2008

(87) PCT Pub. No.: WO2007/021022
PCT Pub. Date: Feb. 22, 2007

(65) Prior Publication Data
US 2009/0122407 A1    May 14, 2009

(30) Foreign Application Priority Data
Aug. 16, 2005   (JP) .................................. 2005-235710

(51) Int. Cl.
*B32B 3/26*      (2006.01)
*B32B 3/06*      (2006.01)
(52) U.S. Cl. ................... 428/312.6; 428/34.1; 428/34.4; 428/304.4; 428/312.2; 428/426
(58) Field of Classification Search ............. 501/45, 501/46, 53; 428/34.1, 34.4, 304.4, 312.2, 428/312.6, 426
See application file for complete search history.

(56) References Cited

U.S. PATENT DOCUMENTS

| 6,573,026 | B1 | 6/2003 | Aitken et al. |
| 2002/0076655 | A1* | 6/2002 | Borrelli et al. ................ 430/321 |
| 2004/0180773 | A1* | 9/2004 | Schreder et al. .................. 501/7 |
| 2006/0091112 | A1 | 5/2006 | Neveu et al. |

FOREIGN PATENT DOCUMENTS

| JP | 2002-311277 A | 10/2002 |
| JP | 2003-506731 A | 2/2003 |
| JP | 2003-110206 | 4/2003 |
| JP | 2003-236928 A | 8/2003 |
| JP | 2003-260581 A | 9/2003 |
| JP | 2003-340588 | 12/2003 |

(Continued)

OTHER PUBLICATIONS

International Search Report for International Application No. PCT/JP2006/316286 mailed Oct. 17, 2006.

(Continued)

*Primary Examiner* — Gwendolyn Blackwell
(74) *Attorney, Agent, or Firm* — Cantor Colburn LLP

(57) ABSTRACT

The present invention may provide a structure capable of obtaining a higher difference in refractive indices between that of a transparent material and that of a cavity, than in the past, and a manufacturing method thereof, and the present invention provides a structure having a transparent material and an internal cavity which is formed by irradiating said transparent material with a pulse laser beam having a pulse width of $10 \times 10^{-12}$ seconds or less, and wherein refractive index of said transparent material at d line is $n_d \geq 1.3$.

25 Claims, 11 Drawing Sheets

FOREIGN PATENT DOCUMENTS

| | | |
|---|---|---|
| JP | 2004-196585 A | 7/2004 |
| JP | 2004-279957 A | 10/2004 |
| JP | 2004-310009 | 11/2004 |
| JP | 2006-239718 | 9/2006 |

OTHER PUBLICATIONS

K. Itoh et al., Micromachining of Three-Dimensional Devices in Glass, Journal of Japan Laser Processing Society, vol. 12, No. 2, Apr. 2005, pp. 91-95.

K. Hirao et al., Advanced Technology and Application of Functional Nanotechnology Glasses, CMC Publishing Co., Ltd., Dec. 2003, pp. 175-199.

K. Ke et al., Rapidly Prototyped Three-Dimensional Nanofluidic Channel Networks in Glass Substrates, Anal. Chem., vol. 77, No. 16, Aug. 15, 2005, pp. 5083-5088.

S. Kanehira et al., Periodic Nanovoid Structures via Femtosecond Laser Irradiation, Nano Lett., vol. 5, No. 8, Aug. 15, 2005, pp. 5083-5088.

G.J. Lee et al., Femtosecond Laser Fabrication of Surface-Relief Grating and Internal Diffraction Grating in Glasses, J. Korean Phys. Soc., vol. 46, No. Supplementary 2, Jun. 2005, pp. S175-S180.

Hong-Bo Sun, et al., "Microfabrication and Characteristics of Two-Dimensional Photonic Crystal Structures in Vitreous Silica", Optical Review, vol. 6, No. 5 (1999) pp. 396-398.

Hong-Bo Sun, et al., "Arbitrary-lattice photonic crystals created by multiphoton microfabrication", Mar. 15, 2001, vol. 26, No. 6, Optics Letters, pp. 325-327.

Mitsuru Watanabe, et al., "Transmission and Photoluminescence Images of Three-dimensional Memory in Vitreous Silica", Applied Physics Letters, vol. 74, No. 26, (1999), pp. 3957-3959.

K. Yamazaki, et al., "Three-dimensional Drilling in Polymer Films by Femtosecond Laser Pulse Irradiation", the 49th Meeting of the Japan Society of Applied Physics (Tokai University, Hiratsuka, Kanagawa), 28p-YC-9 (lecture proceedings, issue 3, p. 1119), 2000.

Vygantas Mizeikis, et al., "Laser Microfabricated Photonic Crystal Structure in PMMA", the 50th Meeting of the Japan Society of Applied Physics (Kanagawa University, Yokohama, Kanagawa), 27p-YN-7 (Lecture proceedings, issue 3, pp. 1124), 2003.

K. Yamasaki, et al., "Three-Dimensional Micro-Channels in Polymers: one-step fabrication", Applied Physics A, vol. 77 (2003), pp. 371-373.

C. B. Schaffer, et al., "Morphology of femtosecond laser-induced structural changes in bulk transparent materials", Applied Physics Letters, vol. 84, No. 9 (2004), pp. 1441-1443.

Kazuhiro Yamada, et al., "Multilevel phase-type diffractive lenses in silica glass induced by filamentation of femtosecond laser pulses", Optics Letters, vol. 29, No. 16 (2004), pp. 1846-1848.

Shigeki Matsuo, et al., "Direct measurement of laser power through a high numerical aperture oil immersion objective lens using a solid immersion lens", Review of Scientific Instruments, vol. 73, No. 5 (2002) pp. 2011-2015.

N. Takeshima, et al.: "Three-dimensional Microfabrication of Glasses by Femtosecond Laser Pulses"; 45th symposium on glass and photonics material (National Institute for Materials Science Advacned Materials Laboratory, Tsukuba Ibaraki) A-1 (lecture abstract pp. 2-3), Nov. 25 and 26, 2004.

* cited by examiner

SPECTRUM INTENSITY OF INCIDENT LIGHT 1

TRANSMITTANCE SPECTRUM OF COLOR FILTER

SPECTRUM INTENSITY OF DIFFRACTED
LIGHT DERIVED FROM INCIDENT LIGHT 1

LIGHT 1: $\lambda_1$
LIGHT 2: $\lambda_2$

US 8,097,337 B2

STRUCTURE AND MANUFACTURING METHOD OF THE SAME

Priority is claimed on Japanese Patent Application No. 2005-235710, filed Aug. 16, 2005, the content of which is incorporated herein by reference.

TECHNICAL FIELD

The present invention relates to a structure with an internal cavity which is formed by subjecting a transparent material, especially a glass material, to the condensed irradiation of an ultra-short pulsed laser beam with a pulse width of 10 pico ($10 \times 10^{-12}$) seconds or less, and its manufacturing method. The present invention particularly relates to a structure which is suitable for application as optical components used in picture imaging devices, image display devices, optical information processing devices, optical communications system devices, or the like and also suited for use as a minute flow path for liquids, and its manufacturing method.

BACKGROUND ART

In recent years, there are increasing demands for reductions in the size and the weight of elements by making the surface and the inside of a structure (components), which is formed from transparent materials such as glasses and plastics, highly sophisticated, and further by incorporating such components. For meeting such demands, two approaches are taken. One is a technical approach on the material side, i.e., making the materials themselves into composites, hybrids, or the like, and another is a technical approach on the processing side, i.e., incorporating functional regions or performing structure control.

Specifically, as a technical approach on the processing side, processing of the material surface is performed by techniques such as polishing, grinding, dry etching, and wet etching. However, when making a complex surface structure, since the number of processes increases and the processed regions are restricted to two-dimensional processing of the material surface, the degree of freedom in processing is low. Moreover, since gases and liquids are discharged together with processing waste after processing, it is required to treat them appropriately from an environmental viewpoint. On the other hand, as a method (technology) for forming, inside the structure formed from a transparent material, a structure region, which has a different material quality from that of the original material, phase separation (composition change) and a method for causing crystallization by use of external fields, such as heat, pressure, an electric field, a magnetic field, and an optical electric field, have been examined. However, apart from the optical electric field, the other external fields are unsuitable for processing which forms different structures at arbitrary places (regions) inside the structure since they affect the entire structure.

On the other hand, there is a method to form a permanent refractive index-changing region inside a structure by irradiating a transparent material with a condensed laser beam with an extremely short pulse width of $10 \times 10^{-12}$ seconds or less, as the optical electric field. This processing method is able to form complex shapes three-dimensionally at arbitrary places inside the structure and the lamination of structure is also easy. Furthermore, it is attracting attention since there is no release of processing waste and thus, the environmental burden is also low. For example, various structures which form diffraction gratings, internal structures with optical functionality such as photonic crystals, or micro flow paths, have been proposed (for example, see patent documents 1-5 and non-patent documents 1-8).

Since it becomes possible to highly sophisticate these structures having a light-controlling function such as diffraction gratings or photonic crystals, as differences in refractive indices between that of a transparent material and that of a refractive-index changing region increase, selection of such transparent materials, methods for irradiating lasers, or the like is studied.

The refractive-index changing region is formed by various causes such as densification, presence of cavities, phase splitting, crystallization, changes in valence, and the like and the refractive index also varies depending on the combination of transparent materials subjected to laser irradiation and irradiating conditions. Plastics or glasses are used as transparent materials in many cases for their satisfactory formability and processability. However, since plastics generally have lower refractive indices compared to those of inorganic materials such as glass and thus, inferior in heat-, water-, and chemical resistances or the like, there are many limitations when they are used as optical components.

For this reason, many inorganic glasses are used for the structures processed by ultrashort pulse lasers. Moreover, many of the refractive index-changing regions formed inside glass are caused by densification and variation of the refractive index thereof is approximately 0.1 to 1%.

Accordingly, in the below non-patent document 1, in order to achieve much larger differences in refractive indices, optical waveguides or photonic crystal structures which have a high refractive-index region where crystallites of a compound semiconductor are deposited/grown by irradiating the inside of a mother glass in which compound semiconductor is dispersed with an ultrashort pulse laser beam, is proposed. Specifically, a three-dimensional photonic crystal structure (log-pile structure) which uses a region where the refractive index is high and where the concentration of fine particles of CdSe crystals is high only in focal region is disclosed. However, in this case, it is not preferable since the mother glass needs to contain components such as Cd and Se, which poses a heavy burden on the environment.

On the other hand, optical components forming a cavity inside a glass and using the difference in the refractive indices of this cavity (a part with reduced refractive index) and of a part which is not laser-irradiated yet has been proposed. Although the mechanism which forms cavities inside the glass of these optical components is not yet clear at this stage, it is considered as following. When a laser beam with an extremely short pulse width and an extremely high field strength per unit time and unit space, such as a femtoseconds pulse laser beam, is condensed and irradiated on the inside of transparent materials, numerous free carriers generate within this extremely short time through non-linear optical effects such as a multiphoton absorption process or a tunnel effect. Atoms (nuclei) from which electrons are stripped off are positively charged and cause Coulomb explosion due to repulsion among positive charges. Nuclei which are present at the place are spread around by this explosion and remain fixed to form cavities.

As examples of structures having such cavities internally, below non-patent document 2 discloses a two-dimensional photonic crystal structure in which a fine cavity tube is arranged in a triangular lattice-like manner inside a silica glass; below non-patent document 3 discloses a three-dimensional photonic crystal structure where cavities inside the silica glass, which is doped with 10% Ge, are laminated in a face-centered cubic lattice-like manner; the below patent document 3 discloses optical attenuating waveguide material using cavity section which is formed in optical fiber made of silica glass; and the below non-patent document 4 discloses reading-out of optical memory using the cavity inside silica glass.

Although it is known that the abovementioned cavity is formed in the aforementioned silica glass, a Ge-doped silica glass, or Corning 0211 (zinc borosilicate glass), which is described in below non-patent document 8, it has not been clarified specifically what kind of composition is required for a glass to form an internal cavity. For this reason, currently available structures (components), which have an internal cavity, have not reached the stage where optical properties thereof such as refractive index or other physical properties such as thermal-, mechanical-, or electrical properties can be selected, and the degree of freedom in component design is also low. Moreover, a silica glass or a Ge-doped silica glass has a considerably high melting temperature and thus, a considerably high working temperature is required in order to obtain such glasses. For this reason, there are also problems of high costs for energy and the need for special manufacturing methods.

[patent document 1] Japanese Laid-Open Patent Application No. 2002-311277
[patent document 2] Japanese Laid-Open Patent Application No. 2003-506731
[patent document 3] Japanese Laid-Open Patent Application No. 2004-279957
[patent document 4] Japanese Laid-Open Patent Application No. 2003-236928
[patent document 5] Japanese Laid-Open Patent Application No. 2004-196585
[patent document 6] Japanese Laid-Open Patent Application No. 2003-260581
[non-patent document 1] N. Takeshima, Y Narita, T. Osada, S. Tanaka, K. Hirao "Three-dimensional micromachining of glass by femtosecond laser" 45th symposium on glass and photonics material (National Institute for Materials Science, Advanced Materials Laboratory, Tsukuba, Ibaraki) A-1 (lecture abstract pp. 2-3)
[non-patent document 2] H-B. Sun, Y Xu, S. Matsuo and H. Misawa, Optical Review Vol. 1.6, No. 5 (1999) pp. 396-398.
[non-patent document 3] H-B. Sun, Y Xu, K. Sun, S. Juodkazis, M. Watanabe, S. Matsuo, H. Misawa, Opt. Lett., 26 (2001) pp. 325
[non-patent document 4] M. Watanabe, S. Juodkazis, H-B. Sun, S. Matsuo, H. Misawa "Transmission and photoluminescence image of three-dimensional memory in vitreous silica" Applied Physics Lett. Vol. 74, No. 26 (1999) pp. 3957-3959.
[non-patent document 5] V. Mizeikis, K. Yamasaki, S. Juodkazis, S. Matsuo, H. Misawa, "Laser microfabricated photonic crystal structure in PMMA" The 50th Meeting of the Japan Society of Applied Physics (Kanagawa University, Yokohama, Kanagawa) 27p-YN-7 (lecture proceedings, issue 3, pp. 1124)
[non-patent document 6] K. Yamasaki, M. Watanabe, S. Juodkazis, S. Matsuo, H. Misawa, "Three-dimensional processing of polymer film by irradiation of condensed femtosecond laser pulse" The 49th Meeting of the Japan Society of Applied Physics (Tokai University, Hiratsuka, Kanagawa) 28p-YC-9 (lecture proceedings, issue 3, pp. 1119)
[non-patent document 7] K. Yamasaki, S. Juodkazis, S. Matsuo, H. Misawa, "Three-dimensional micro-channels in polymers: one-step fabrication" Applied Physics A, Vol. 77, No. 3-4, pp. 371-373 (2003)
[non-patent document 8] C. B. Schaffer, A. O. Jamison, E. Mazur "Morphology of femtosecond laser-induced structural changes in bulk transparent materials" Applied Physics Lett. Vol. 84, No. 9 (2004) pp. 1441-1443
[non-patent document 9] K. Yamada, W. Watanabe, Y. Li, K. Itoh, J. Nishii, "Multilevel approximation of phase-type diffractive lens in silica glass induced by filamentation of femtosecond laser pulses" Opt. Lett. Vol. 29, No. 16, pp. 1846-1848 (2004)
[non-patent document 10] S. Matsuo, H. Misawa, "Direct Measurement of laser power through a high numerical aperture oil immersion objective lens using a solid immersion lens" Review of Scientific Instrument, Vol. 73, No. 5 (2002) pp. 2011-2015.

DISCLOSURE OF INVENTION

Problems to be Solved by the Invention

As described so far, as for the structure having a cavity which is formed by cavity-formation means using an external field, especially a pulse laser with a pulse width of $10 \times 10^{-12}$ seconds or less, they are limited to those using some transparent materials such as glasses or plastics with known refractive indices. For this reason, in conventional structures, especially when used for optics, there are few options in terms of their refractive indices and differences in refractive indices and thus, low degree of freedom in design of an optical element alone or of those combining the optical elements has been a problem. Accordingly, the present invention is proposed by taking such situations in the past into consideration. In a structure having an internal cavity which is formed by condensing and irradiating an ultrashort pulse laser with a pulse width of $10 \times 10^{-12}$ seconds or less onto transparent material, an objective of the present invention is to provide a structure capable of obtaining a higher difference in refractive indices between that of a transparent material and that of a cavity, than in the past, and a manufacturing method thereof.

Means for Solving the Problem

The first aspect of the present invention may comprise a structure having a transparent material and a cavity, which is formed inside a transparent material by cavity-formation means, and the refractive index of the transparent material at the d line is $n_d \geq 1.3$.

The second aspect of the present invention may comprise a structure characterized in that having a transparent material and an internal cavity, which is formed by irradiating the transparent material with a pulse laser beam with a pulse width of $10 \times 10^{-12}$ seconds or less, and the refractive index of the transparent material at the d line is $n_d \geq 1.3$.

The third aspect of the present invention may comprise a structure according to first or second aspect characterized in that the transparent material contains at least one or more components selected from the group consisting of $SiO_2$, $GeO_2$, $B_2O_3$, and $P_2O_5$, and the total amount of components selected from the group is 40% or more in terms of mol %.

The fourth aspect of the present invention may comprise a structure according to any one of first to third aspects characterized in that the transparent material is a glass with a refractive index of $n_d \geq 1.3$ with a proviso that a glass with $n_d < 1.53$ and which contains 70% or more of $SiO_2$ is excluded.

The fifth aspect of the present invention may comprise a structure according to the third aspect characterized in that the transparent material is a glass with a refractive index of $n_d \geq 1.3$ and which contains 10% or more of $SiO_2$ in terms of mol % and the proportion of $SiO_2$ is higher than that of other respective components.

The sixth aspect of the present invention may comprise a structure according to the fifth aspect characterized in that the transparent material contains either one of $B_2O_3$ (less than 40% in terms of mol %) and $P_2O_5$ (less than 40% in terms of mol %) or both.

The seventh aspect of the present invention may comprise a structure according to the third aspect characterized in that the transparent material is a glass with a refractive index of $n_d \geq 1.3$ and which contains 10% or more of $SiO_2$ and $GeO_2$ in total in terms of mol % and the proportion of the total amount of $SiO_2$ and $GeO_2$ is higher than that of other respective components contained therein and the ratio of the two components therein is $GeO_2/SiO_2 > 0.1$ in terms of mol ratio.

The eighth aspect of the present invention may comprise a structure according to the seventh aspect characterized in that the transparent material contains either one of $B_2O_3$ (less than 40% in terms of mol %) and $P_2O_5$ (less than 40% in terms of mol %) or both.

The ninth aspect of the present invention may comprise a structure according to the third aspect characterized in that the transparent material is a glass with a refractive index of $n_d \geq 1.3$ and which contains 10% or more $B_2O_3$ in terms of mol % and the proportion of $B_2O_3$ is higher than that of other respective components contained therein.

The tenth aspect of the present invention may comprise a structure according to the ninth aspect characterized in that the transparent material contains either one of $SiO_2$ (less than 40% in terms of mol %) and $P_2O_5$ (less than 40% in terms of mol %) or both.

The eleventh aspect of the present invention may comprise a structure according to the third aspect characterized in that the transparent material is a glass with a refractive index of $n_d \geq 1.3$ and which contains 10% or more $P_2O_5$ in terms of mol % and the proportion of $P_2O_5$ is higher than that of other respective components contained therein.

The twelfth aspect of the present invention may comprise a structure according to the eleventh aspect characterized in that the transparent material contains either one of $SiO_2$ (less than 40% in terms of mol %) and $B_2O_3$ (less than 40% in terms of mol %) or both.

The thirteenth aspect of the present invention may comprise a structure according to the first or second aspect characterized in that the transparent material is a glass with a refractive index of $n_d \geq 1.3$ and which contains at least one or more components selected from the group consisting of $SiO_2$, $GeO_2$, $B_2O_3$, and $P_2O_5$ and the total amount of the components selected from the group is more than 0% and less than 40% in terms of mol %.

The fourteenth aspect of the present invention may comprise a structure according to the thirteenth aspect characterized in that the transparent material contains at least one or more components selected from the group consisting of $Sc_2O_3$, $TiO_2$, $V_2O_5$, $Y_2O_3$, $ZrO_2$, and $Nb_2O_5$ and the amount of components selected from the group is 40% or more in terms of mol %.

The fifteenth aspect of the present invention may comprise a structure according to any one of second to fourteenth aspects characterized in that among the components contained in the glass, oxygen of the oxide components is partially substituted by fluorine.

The sixteenth aspect of the present invention may comprise a structure according to any one of second to fifteenth aspects characterized in that the transparent material has 10% or more transmittance for the wavelength of pulse laser beam by 1 mm-thickness thereof.

The seventeenth aspect of the present invention may comprise a structure according to any one of second to sixteenth aspect characterized in that power density of the pulse laser beam at a focal position is $1 \times 10^8$ W/cm$^2$ or more.

The eighteenth aspect of the present invention may comprise a structure according to any one of second to seventeenth aspects characterized in that the maximum length of a cavity in the direction perpendicular to the incident direction of pulse laser beam is 2 μm or less.

The nineteenth aspect of the present invention may comprise a structure according to any one of first to eighteenth aspects characterized in that the cavity has a linear or a curved shape.

The twentieth aspect of the present invention may comprise a structure according to any one of first to nineteenth aspects characterized in that a plurality of cavities are periodically arranged in a two or three dimensional positional relationship. The twenty first aspect of the present invention may comprise a manufacturing method of a structure characterized in that a cavity is formed inside a transparent material by irradiating pulse laser beam having a pulse width of $10 \times 10^{-12}$ seconds or less onto the transparent material.

The twenty second aspect of the present invention may comprise a manufacturing method of a structure according to the twenty first aspect characterized in that pulse laser beam is condensed inside the transparent material so that power density thereof at said focal position is $1 \times 10^8$ W/cm$^2$ or more.

The twenty third aspect of the present invention may comprise the manufacturing method of a structure according to twenty first or twenty second aspect characterized in that a plurality of cavities are simultaneously formed inside the transparent materials by irradiating the transparent material with a plurality of pulse laser beams.

The twenty fourth aspect of the present invention may comprise the manufacturing method of a structure according to any one of twenty first to twenty third aspects characterized in that a plurality of cavities are periodically arranged in a two- or three dimensional positional relationship.

The twenty fifth aspect of the present invention may comprise a lens using the structure according to any one of first to twentieth aspects.

The twenty sixth aspect of the present invention may comprise a prism using the structure according to any one of first to twentieth aspects.

The twenty seventh aspect of the present invention may comprise a diffraction grating using the structure according to any one of first to twentieth aspects.

The twenty eighth aspect of the present invention may comprise an optical filter using the structure according to any one of first to twentieth aspects.

Effects of the Invention

As described above, in the structure according to the present invention, an internal cavity may be present which is formed by cavity formation means using an external field, especially one formed by irradiation of condensed ultrashort pulse laser with a pulse width of $10 \times 10^{-12}$ seconds or less, and since differences in refractive indices between that of this cavity and a part of transparent material, which is not laser-irradiated yet, are used, larger differences in refractive indices can be achieved by enhancing the refractive indices of transparent materials. Accordingly, when this structure is used as an optical component, it is possible to provide optical components which are more compact and also highly sophisticated by achieving larger differences in refractive indices compared to those in the past.

Moreover, it is possible to select required optical characteristics (refractive index and dispersion) where appropriate and to manufacture optical components with high degree of freedom at a component-designing stage.

Furthermore, since it is possible to achieve larger differences in refractive indices and thus, possible to reduce the size of internal structure than in the past, improvements in through-put due to shortening of laser beam-irradiating time, manufacturing of glass at lower temperature than in the past, and the reduction in manufacturing cost become possible.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 22 is a schematic diagram showing one example of a waveguide, which is a linear cavity where the light is guided to.

BEST MODE FOR CARRYING OUT THE INVENTION

Figure 1:
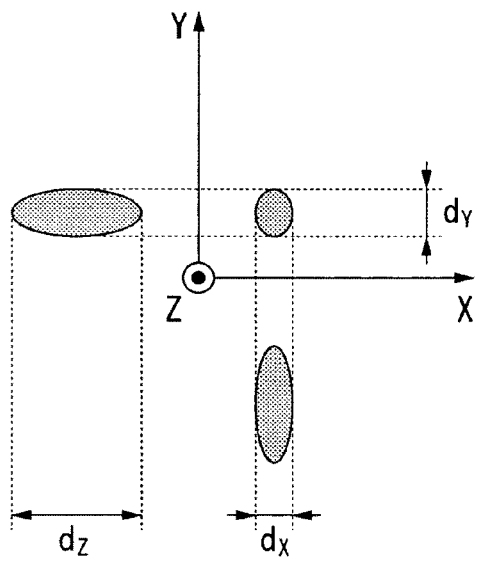
FIG. 1 is a schematic diagram showing a projected image when three-dimensional shape of a cavity is projected onto XY—, YZ—, and ZX surfaces.

Hereinafter, preferred embodiments of the present invention will be described with reference to figures. However, the present invention is not limited to each embodiment described below and, for example, the present invention may also combine elements which are constituting these embodiments where appropriate.

The structure which applied the present invention and its production method will be described in detail with reference to figures below. In the present invention, the cavities formed inside transparent materials refer to those that are formed secondarily by using the external field after the production of transparent materials and excluding air bubbles that are generated at the time of producing transparent materials. For example, air bubbles that are mixed when high-temperature melt solution is solidified, vetrified, or crystallized; air bubbles which remain in grain boundaries at the time of sintering and densification of powder; or connected pores present in porous materials are excluded.

The refractive index at d line (wavelength of 587.56 nm) of the transparent material is preferably $n_d \geq 1.3$ and more preferably $n_d \geq 1.53$ and most preferably $n_d \geq 1.55$. Moreover, the upper limit for the refractive index may be extended to $n_d \leq 3.3$ if the transparent material is in the form of single crystals and to $n_d \leq 2.5$ if the transparent material is glass.

Accordingly, according to the present invention, in the structures which have cavities internally, it is possible to provide structures with larger differences in refractive index compared to those in the past and thereby, the use thereof as optical components can be extended. When used in an apparatus, for example a camera or the like, with an optical system, which is constituted of a plurality of lenses and prisms, it is possible to use structures of the present invention with different refractive indices or dispersion by appropriately combining those with refractive indices that fall within the abovementioned range.

Any of organic or inorganic solids, glasses, glass ceramics, single crystals, or sintered bodies can be used as the transparent materials. Moreover, it is also possible to use composite materials or hybrid materials of organic and inorganic materials. In the present invention, as the aforementioned cavity-formation means, it is preferable to subject the transparent materials to irradiation by a condensed pulse laser beam with a pulse width of $10 \times 10^{-12}$ seconds or less. Minute cavities can be formed three-dimensionally in a desired position inside the material without causing deformation or destruction of the material with this procedure and degrees of freedom in processing are also highly enhanced. Detailed conditions and irradiating method of this pulse laser will be described later.

The transparent materials contain at least one or more components selected from the group consisting of $SiO_2$, $GeO_2$, $B_2O_3$, and $P_2O_5$ and it is preferable that the total amount of the components selected from the group is 40% or more in terms of mol %. Specifically, glass selected from the above group which is excellent in formability, thermal stability, water resistance, chemical resistance, mass productivity, or the like are preferably used as the aforementioned transparent materials. In this case, the total amount of components selected from the group is preferably between 40 and 100% in terms of mol % and more preferably between 50 and 95% and most preferably between 50 and 95%. Glass is stable within the abovementioned ranges and it is also possible to adjust refractive indices thereof with ease by containing other components.

Moreover, the present inventors discovered, as a result of intensive research, that the aforementioned glass readily forms internal cavities when irradiated with a pulse laser beam. Although the reason for this glass being prone to the formation of internal cavities is not clear at this stage, as mentioned above, since cavities are formed by spreading of atoms (nuclei) due to Coulomb explosion, it is considered that the more structural voids are present in the vicinity, the more likely for nuclei to diffuse to the periphery. In other words, it is considered as the following. Although glass network-structure intricately changes due to combinations of the abovementioned respective glass components or combinations thereof with other components therein, so-called modifier oxide components such as alkali oxides and alkali-earth oxides cut original glass network structures and are present in glass by entering gaps among the cut structures. Accordingly, the number of structural voids (gaps filled with the above oxide components) increases and cavity formation becomes easy by setting the total amount of these oxides, which form new glass network by filling gaps, to the abovementioned range.

It should be noted that among the glass with aforementioned composition range, glass with $n_d<1.53$ and which contains 70% or more of $SiO_2$ is excluded. Glass used in the present invention is preferably those which can be manufactured relatively easily in an electric- or a flame-melting furnace using crucibles at a temperature of 1550° C. or less and more preferably glasses which can be manufactured at a temperature of 1500° C. or less, and most preferably glasses which can be manufactured at a temperature of 1450° C. or less. This is because when $SiO_2$ is 70% or more, the solubility of starting materials is generally poor and also because the temperature for dissolution process is higher than 1550° C. in order to improve homogeneity and removal of bubbles.

It is preferable to use glass which contains 10% or more of $SiO_2$ in terms of mol % and the proportion of this $SiO_2$ is higher than that of other respective components therein for the structures of the present invention. In this case, glass with a refractive index whose upper limit is $n_d \leq 1.8$ are achieved and cavity formation is also easy. Since thermal characteristics of glass and its water resistance improve as $SiO_2$ content therein increases, the lower limit of the content is 10% or more. The lower limit is more preferably 15% or more and most preferably 20% or more. On the other hand, since the dissolution temperature at the time of glass production rises when the content of $SiO_2$ is too high, the upper limit of the content is less than 100%. The upper limit is more preferably 80% or less and most preferably 70% or less.

Moreover, it is also possible to make this glass contain either one of $B_2O_3$ (less than 40%) and $P_2O_5$ (less than 40%) in terms of mol % or both. Since the dissolution temperature at the time of glass production falls when these $B_2O_3$ and/or $P_2O_5$ are present, the lower limit of the content thereof is more than 0. The lower limit is more preferably 5% or more and most preferably 10% or more. On the other hand, when the content of $B_2O_3$ and/or $P_2O_5$ is too high, since phase separation becomes increasingly likely and this becomes a cause of light scattering at the time of laser irradiation or when using the structure, the upper limit of the content is less than 40%. The upper limit is more preferably 35% or less and most preferably 30% or less. Moreover, it is preferable that $B_2O_3/SiO_2<0.2$ in terms of mol ratio. In this case, glass which is unlikely to cause phase separation can be obtained.

Moreover, this glass may contain alkali oxides $R_2O$ and/or alkali-earth oxides R'O wherein R represents any one of Li, Na, K, Rb, and Cs and wherein R' represents any one of Mg, Ca, Sr, and Ba. In this case, the total amount of alkali oxides and alkali-earth oxides is preferably less than 30% in terms of mol % and more preferably less than 20% and most preferably less than 17%. Moreover, the content of each alkali oxide is preferably less than 20% and the content of each alkali-earth oxide is preferably less than 30%. Due to this, lowering of dissolution temperature and adjustments of refractive index and dispersion becomes possible. Especially when $Li_2O$ is present, the content of $Li_2O$ is preferably less than 10% and more preferably less than 8% and most preferably less than 6%.

Moreover, this glass may contain $Al_2O_3$ and/or ZnO and in this case, the amount of $Al_2O_3$ and ZnO put together is preferably less than 6% in terms of mol %. Lowering of the dissolution temperature and the stabilization of glasses become possible due to this and cavity formation also becomes easier.

Moreover, this glass may contain at least one or more components selected from the group consisting of $ZrO_2$, $TiO_2$, and $Nb_2O_5$. Since the solubility of glass reduces when the contents of the components selected from the group are too high, it is preferable to include alkali oxides and/or alkali-earth oxides at the same time. In this case, the total amount of components selected from the group, alkali oxides, and alkali-earth oxides is preferably less than 30% in terms of mol % and more preferably less than 25%. Moreover, the content of each component selected from the group is preferably less than 15% and more preferably less than 10% and most preferably less than 5%. Due to this, glass with a high refractive index can be achieved and the chemical durability thereof can be improved.

For the structures of the present invention, it is preferable to use glass which contains 10% or more of $SiO_2$ and $GeO_2$ in terms of mol %, whose proportion of these $SiO_2$ and $GeO_2$ in total is higher than that of other respective components therein, and the ratio of the two components therein is $GeO_2/SiO_2>0.1$ in terms of mol ratio. In this case, glass with a refractive index whose upper limit is $n_d \leq 1.9$ is achieved and cavity formation also becomes easy. Since thermal characteristics of glass and its water resistance improve as the total amount of $SiO_2$ and $GeO_2$ therein increases, the lower limit of the content is 10% or more. The lower limit is more preferably 15% or more and most preferably 20% or more. On the other hand, the upper limit of the content is less than 100% and more preferably 90% or less and most preferably 85% or less. Since the dissolution temperature at the time of glass production can be reduced and refractive index of glass can also be enhanced as the value of $GeO_2/SiO_2$ in terms of mol ratio increases, the lower limit of the mol ratio is more than 0.1. The lower limit of the mol ratio is more preferably 0.2 or more and most preferably 0.3 or more.

Furthermore, it is also possible to make this glass contain either one of $B_2O_3$ (less than 40% in terms of mol %) and $P_2O_5$ (less than 40% in terms of mol %) or both. Since the dissolution temperature at the time of glass production falls when these $B_2O_3$ and/or $P_2O_5$ are present, the lower limit of the content thereof is more than 0 and more preferably 5% or more and most preferably 10% or more. On the other hand, when the content of $B_2O_3$ and/or $P_2O_5$ is too high, since phase separation becomes increasingly likely and this becomes a cause of light scattering at the time of laser irradiation or when using the structure, the upper limit of the content is less than 40%. The upper limit is more preferably 35% or less and most preferably 30% or less. Moreover, it is preferable that $B_2O_3/(SiO_2+GeO_2)<0.3$ in terms of mol ratio and more preferably $B_2O_3/(SiO_2+GeO_2)<0.2$. In this case, glass which is unlikely to cause phase separation can be obtained.

Moreover, this glass may contain alkali oxides $R_2O$ and/or alkali-earth oxides $R'O$ wherein R represents any one of Li, Na, K, Rb, and Cs and wherein R' represents any one of Mg, Ca, Sr, and Ba. In this case, the total amount of alkali oxides and alkali-earth oxides is preferably less than 30% in terms of mol % and more preferably less than 20% and most preferably less than 17%. Moreover, the content of each alkali oxide is preferably less than 20% and the content of each alkali-earth oxide is preferably less than 30%. Due to this, lowering of dissolution temperature and adjustments of refractive index and dispersion becomes possible. Especially when $Li_2O$ is present, the content of $Li_2O$ is preferably less than 10% and more preferably less than 8% and most preferably less than 6%.

Moreover, this glass may contain $Al_2O_3$ and/or ZnO and in this case, the total amount of $Al_2O_3$ and ZnO is preferably less than 6% in terms of mol %. Lowering of the dissolution temperature and the stabilization of glass become possible due to this and the cavity formation also becomes easier.

Moreover, this glass may contain at least one or more components selected from the group consisting of $ZrO_2$, $TiO_2$, and $Nb_2O_5$. Since solubility of glass reduces when the contents of the components selected from the group are too high, it is preferable to include alkali oxides and/or alkali-earth oxides at the same time. In this case, the total amount of components selected from the group, alkali oxides, and alkali-earth oxides is preferably less than 30% in terms of mol % and more preferably less than 25%. Moreover, the content of each component selected from the group is preferably less than 15% and more preferably less than 10% and most preferably less than 5%. Due to this, glass with a high refractive index can be achieved and the chemical durability thereof can be improved.

For the structures of the present invention, it is preferable to use glass which contains 10% or more of $B_2O_3$ in terms of mol % and the proportion of this $B_2O_3$ is higher than that of any other components therein. In this case, glass with a refractive index whose upper limit is $n_d \leq 2.0$ is achieved and cavity formation also becomes easy. Moreover, it is possible to adjust refractive indices readily by including other oxide components. Since the dissolution temperature at the time of glass production reduces and thermal characteristics of glass also improves as $B_2O_3$ content therein increases, the lower limit of the content is 10% or more and more preferably 15% or more and most preferably 20% or more. On the other hand, since the water resistance of glass deteriorates when the content of $B_2O_3$ is too high, the upper limit of the content is 90% or less and more preferably 80% or less and most preferably 70% or less.

Furthermore, it is also possible to make this glass contain either one of $SiO_2$ (less than 40% in terms of mol %) and $P_2O_5$ (less than 40% in terms of mol %) or both. Since $SiO_2$ is effective in improving water resistance of glass between the two when the content thereof is low, the lower limit of the content is more than 0 and more preferably 3% or more and most preferably 5% or more. However, since $SiO_2$ becomes a cause of insoluble remnants or devitrification when the content thereof is high, the upper limit of the content is less than 40% and more preferably 30% or less and most preferably 20% or less. On the other hand, since $P_2O_5$ reduces the dissolution temperature at the time of glass production and also improves water resistance, the lower limit of the content thereof is more than 0 and more preferably 3% or more and most preferably 5% or more. However, since phase separation becomes increasingly likely when the content of $P_2O_5$ is high, the upper limit of the content is less than 40% and more preferably 30% or less and most preferably 20% or less. Moreover, in terms of mol ratio, it is preferable that $SiO_2/B_2O_3<0.6$ and more preferably $SiO_2/B_2O_3<0.5$ and most preferably $SiO_2/B_2O_3<0.4$. In this case, glass with less unmelted raw materials can be obtained and chemical durability of glass can be improved.

Moreover, this glass may contain alkali oxides $R_2O$ and/or alkali-earth oxides $R'O$ wherein R represents any one of Li, Na, K, Rb, and Cs and wherein R' represents any one of Mg, Ca, Sr, and Ba. In this case, the total amount of alkali oxides and alkali-earth oxides is preferably less than 50% in terms of mol % and more preferably less than 40% and most preferably less than 35%. Moreover, the content of each alkali oxide is preferably less than 20% more preferably less than 15% and most preferably less than 10%. On the other hand, the content of each alkali-earth oxide is preferably less than 50% and more preferably less than 45% and most preferably less than 40%. Due to this, lowering of dissolution temperature and adjustments of refractive index and dispersion become possible. Moreover, chemical durability of glass can be improved. Moreover, this glass may contain $Al_2O_3$ and/or ZnO and in this case, the total amount of $Al_2O_3$ and ZnO is preferably less than 15% in terms of mol % and more preferably less than 10% and most preferably less than 6%. Lowering of the dissolution temperature and the stabilization of glass become possible due to this and cavity formation also becomes easier.

Moreover, this glass may contain at least one or more components selected from the group consisting of $ZrO_2$, $TiO_2$, and $Nb_2O_5$. Since solubility of glass reduces when the contents of the components selected from the group are high, it is preferable to include alkali oxides and/or alkali-earth oxides at the same time. In this case, the total amount of components selected from the group, alkali oxides, and alkali-earth oxides is preferably less than 60% in terms of mol % and more preferably less than 50% and most preferably less than 40%. Moreover, the content of each component selected from the group is preferably less than 30% and more preferably less than 25% and most preferably less than 20%. Due to this, glass with a high refractive index can be achieved and the chemical durability thereof can be improved.

For the structures of the present invention, it is preferable to use glass which contains 10% or more of $P_2O_5$ in terms of mol % and the proportion of this $P_2O_5$ is higher than that of other respective components therein. In this case, glass with a refractive index whose upper limit is $n_d \leq 2.0$ is achieved and cavity formation also becomes easy. Moreover, it is possible to adjust refractive indices readily by including other oxide components. Since the dissolution temperature at the time of glass production reduces as $P_2O_5$ content therein increases, the lower limit of the content is 10% or more and more preferably 15% or more and most preferably 20% or more. On the other hand, since the water resistance of glass deteriorates when the content of $P_2O_5$ is too high, the upper limit of the content is 95% or less and more preferably 90% or less and most preferably 80% or less.

Furthermore, it is also possible to make this glass contain either one of $SiO_2$ (less than 40% in terms of mol %) and $B_2O_3$ (less than 40% in terms of mol %) or both. Since $SiO_2$ is effective in improving water resistance of glass between the two when the content thereof is low, the lower limit of the content is more than 0 and more preferably 3% or more and most preferably 5% or more. However, since $SiO_2$ becomes a cause of insoluble remnants or devitrification when the content thereof is high, the upper limit of the content is less than 40% and more preferably 35% or less and most preferably 30% or less. On the other hand, since $B_2O_3$ reduces the dissolution temperature at the time of glass production and also improves water resistance, the lower limit of the content thereof is more than 0 and more preferably 3% or more and most preferably 5% or more. However, since phase separation becomes increasingly likely when the content of $B_2O_3$ is high, the upper limit of the content is less than 40% and more preferably 35% or less and most preferably 30% or less. Moreover, by mol ratio, it is preferable that $SiO_2/P_2O_5<0.9$ and more preferably $SiO_2/P_2O_5<0.8$ and most preferably $SiO_2/P_2O_5<0.7$. In this case, glasses with less unmelted raw materials can be obtained and chemical durability of glasses can be improved.

Moreover, this glass may contain alkali oxides $R_2O$ and/or alkali-earth oxides R'O wherein R represents any one of Li, Na, K, Rb, and Cs and wherein R' represents any one of Mg, Ca, Sr, and Ba. In this case, the total amount of alkali oxides and alkali-earth oxides is preferably less than 55% in terms of mol % and more preferably less than 51%. Moreover, the content of each alkali oxide is preferably less than 30% and more preferably less than 25%. On the other hand, the content of each alkali-earth oxide is preferably less than 50% and more preferably less than 45% and most preferably less than 40%. Due to this, lowering of dissolution temperature and adjustments of refractive index and dispersion become possible. Moreover, chemical durability of glass can be improved.

Moreover, this glass may contain $Al_2O_3$ and/or ZnO and in this case, the amount of $Al_2O_3$ and ZnO put together is preferably less than 40% in terms of mol % and more preferably less than 35%. Lowering of the dissolution temperature and the stabilization of glasses become possible due to this and cavity formation also becomes easier.

Moreover, this glass may contain at least one or more components selected from the group consisting of $ZrO_2$, $TiO_2$, and $Nb_2O_5$. Since solubility reduces when the contents of the components selected from the group are high, it is preferable to include alkali oxides and/or alkali-earth oxides at the same time. In this case, the amount of components selected from the group, alkali oxides, and alkali-earth oxides put together is preferably less than 60% in terms of mol % and more preferably less than 50% and most preferably less than 45%. Moreover, the content of each component selected from the group is preferably less than 40% and more preferably less than 30% and most preferably less than 20%. Due to this, glasses with a high refractive index can be achieved and the chemical durability of glasses can be improved.

For the structures of the present invention, it is preferable to use glass which contains at least one or more components selected from the group consisting of $SiO_2$, $GeO_2$, $B_2O_3$, and $P_2O_5$ and the total amount of components selected from the group therein is more than 0% in terms of mol % but less than 40%. The total amount is more preferably between 5% and 30% and most preferably between 10% and 30%. Among the aforementioned components of glass, since $B_2O_3$ and $P_2O_5$ are especially likely to form glass even in the regions where modifier oxide components are abundant, the proportion of $B_2O_3$ and $P_2O_5$ in total is, more preferably, higher than that of the aforementioned respective component; i.e. $SiO_2$, $GeO_2$, $B_2O_3$, and $P_2O_5$.

Furthermore, this glass contains one or more oxide components selected from the group consisting of $Sc_2O_3$, $TiO_2$, $V_2O_5$, $Y_2O_3$, $ZrO_2$, and $Nb_2O_5$. The total amount of oxide components selected from the group is preferably 40% or more in terms of mol % and more preferably 45% or more and most preferably 50% or more. In this case, glass whose refractive index is between 1.6 and 2.2 can be obtained while maintaining the specific gravity thereof low by adding these oxide components and the cavity formation also becomes easy. The specific gravity of glass is, for example, preferably 5.5 or less and more preferably 5 or less and most preferably 4.5 or less. On the other hand, since it becomes difficult to obtain glass when the total amount of these oxide components becomes too large, the upper limit of the total amount is 90% or less and more preferably 80% or less and most preferably 70% or less.

Moreover, among these oxide components, $TiO_2$ or $Nb_2O_5$ can be included, together with $B_2O_3$ and/or $P_2O_5$, in a relatively large amount. The content of each component is preferably more than 0% in terms of mol % and more preferably 5% or more and most preferably 10% or more. On the other hand, since devitrification becomes likely at the stage of glass production when the content becomes too high, the upper limit of the content is 90% or less and more preferably 80% or less and most preferably 70% or less.

Furthermore, this glass may contain at least one or more of alkali oxides $R_2O$, wherein R represents any one of Li, Na, K, Rb, and Cs. The content of each alkali oxide is 15% or less and the total amount of these alkali oxides is preferably 40% or less in terms of mol % and more preferably 30% or less and most preferably 20% or less. Similarly, the glass may also contain at least one or more of alkali-earth oxides R'O, wherein R represents any one of Mg, Ca, Sr, and Ba. The content of each alkali-earth oxide is 60% or less and the total amount of these alkali-earth oxides is preferably 60% or less and more preferably 55% or less and most preferably 50% or less.

In the structure of the present invention, the aforementioned transparent materials are not limited to the above-described oxide glass and fluoride glass where oxygen (O) in the oxide components are partially substituted by fluorine (F), glass whose oxygen is substituted by Cl or Br, or glass manufactured by the use of fluoride salts as raw materials may be used. Due to this, refractive indices and dispersion can be reduced compared to those of oxide glass. Moreover, although the amount of substitution is not particularly limited since it varies greatly depending on glass composition, occurrence of phase separation and devitrification becomes likely at the time of glass production when the amount of substitution becomes too large.

In the structure of the present invention, the aforementioned transparent materials may contain $Sb_2O_3$ as a heat stabilizer or a clarifier. Moreover, the aforementioned transparent materials may also contain $Ag^+$, $Cu^+$, $Cu^{2+}$, $Au^+$, $Eu^+$, $Ce^{3+}$, or elements which are oxidative or reducing due to light, and it is also possible to contain them in the form of metal particles whose diameters are 50 nm or less at most.

In the structure of the present invention, among the components constituting the aforementioned transparent materials, the use of respective component such as Be, Pb, Th, Cd, Tl, As, Os, S, Se, Te, Bi, F, Br, Cl, and I tends to be avoided as hazardous chemical substances in recent years. Accordingly, actions in terms of environmental measures are required not only for glass producing steps but ranging from processing steps to product disposals. For this reason, it is also possible to configure the structure without substantially containing these components when effects on the environment are matters of importance.

Structure of the present invention may also have internal refractive index-changing regions formed by irradiating the aforementioned transparent materials with a low-power pulse laser beam, which is not strong enough to form cavities. In this case, differences in refractive indices between that of the refractive-index changing region and that of transparent material are preferably 0.0001 or more when measured at an arbitrary wavelength between 0.1 and 2 μm and more preferably 0.001 or more and most preferably 0.01 or more. Moreover, changes in refractive index of this refractive-index changing region widely include changes due to photoinduction caused by laser-beam irradiation. For example, changes include those in molecular structure due to electromagnetic field of strong light; or crystallization, crystal growth, consolidation, unhomogenization of density, and phase separation, which are due to various light effects such as thermal changes, photochemical reactions, redox reactions, and non-linear effects. The refractive-index changing region is a region accompanied by the permanent changes in refractive indices due to the above causes.

In the structure of the present invention, transparent materials are compact bodies and preferably contain heterogenous phase, which becomes a cause of light scattering, as less as possible. Heterogenous phase is caused by those which are larger than the light wavelength such as air bubbles which mix at the stage of material production, phase separation, striae, foreign matters, and devitrification. On the other hand, the aforementioned transparent materials may have pores which are sufficiently small compared to the wavelength of irradiated pulse laser beam or to the light wavelength at the time of use and, for example, may be porous materials which are transparent throughout the entire visible light region and with pores of 100 nm or less and more preferably 50 nm or less in diameter.

Shapes of the structure of the present invention include bulk-shapes, film-forms, parallel-plate forms, shapes with curved surfaces and/or pointed parts, and fiber-shapes. Moreover, when irradiating pulse laser beam, surface of the aforementioned transparent material is preferably sufficiently smooth so that irradiated pulse laser beam does not scatter. Specifically, average roughness (Ra) of the surface of the transparent material is preferably 25 nm or less and more preferably 15 nm or less and most preferably 5 nm or less.

Note that it is also possible to subject the structure to a separate surface processing/treatment after the irradiation of pulse laser beam separately.

Although the structure of the present invention is preferably constituted of one homogenous phase, optical fibers having a two-layer structure made of a core and clad, or structures like GRIN lens where refractive indices change continuously or stepwise, are also possible. Moreover, the aforementioned transparent material may be coated by the same or a different transparent material and furthermore, may be optically connected with a different transparent material.

In the structure of the present invention, the aforementioned transparent material preferably have optical transparency in a part of, or throughout the entire visible light region thereby allowing visual confirmation of cavities, which are formed internally, by light microscopes or the like. Moreover, the transparent materials preferably have optical transparency in a range where the wavelength of irradiated pulse laser beam falls within thereby causing multiphoton absorption only at the light-condensed focal point and enabling refined processing. Specifically, the aforementioned transparent materials have, when 1-mm thick, for example, 10% or more of transmittance for pulse laser beam and preferably 50% or more and more preferably 70% or more and most preferably 90% or more. Note that the term transmittance used herein refers to internal transmittance, which is the transmittance excluding the loss due to reflection.

In the structure of the present invention, the aforementioned transparent material becomes more preferable as the specific gravity thereof becomes lighter from the viewpoint of weight reduction and thus, the specific gravity thereof is 5 or less and more preferably 4.5 or less and most preferably 4 or less.

In the structure of the present invention, cavities formed inside the aforementioned transparent materials preferably have maximum length of 2 μm or less in the direction, which is perpendicular to the incident direction of a singular pulse laser beam (one pulse) that caused the cavity formation, and more preferably 1 μm or less and most preferably 800 nm or less. Moreover, the cavity is one continuous cavity which is formed at one focal point where light is condensed and strictly speaking, the periphery thereof is surrounded by highly densified regions.

Cavities are preferably almost spherical-shaped when the structure of the present invention is used especially when used for optical use or when etching treatment is carried out afterwards. When referring to the "almost spherical-shaped cavity", as shown in FIG. 1, this means one continuous cavity which is formed by the aforementioned one light-condensed focal point. The longest and shortest diameter of this almost spherical shaped cavity can be derived from dy, dz, and dx which are distances of project image in each direction when projected onto XY—, YZ—, and ZX surfaces as shown in FIG. 1. For example, in the case of a shape shown in FIG. 1, the longest diameter is dz and the shortest diameter is dx. In the structure of the present invention, the aspect ratio between the longest and shortest diameter of cavities (i.e. the longest diameter divided by the shortest diameter) is preferably 10 or less and more preferably 5 or less and most preferably 3 or less.

In the structure of the present invention, cavities formed inside the aforementioned transparent materials may, not only be one cavity formed at one light-condensed focal point as mentioned above but also, made into continuous shapes as a whole such as straight-line shapes, polygonal shapes, curved-line shapes, spiral shapes, or beaded shapes by connecting a plurality of these cavities.

Specifically, these cavities are preferably arranged (aligned) plurally in a periodical manner in terms of two dimensional- or three dimensional positional-relationships. Moreover, the interval between cavities which are aligned periodically is preferably 5 μm or less and more preferably 2 μm or less and most preferably 1 μm or less from a viewpoint of regulating the wavelength of the light transmitting the transparent materials. Moreover, it is also possible to introduce period modulation or a cavity gap in a part of the period. On the other hand, when making the light scatter/diffuse, there are also some cases where these cavities are preferably not arranged periodically.

Figure 2:
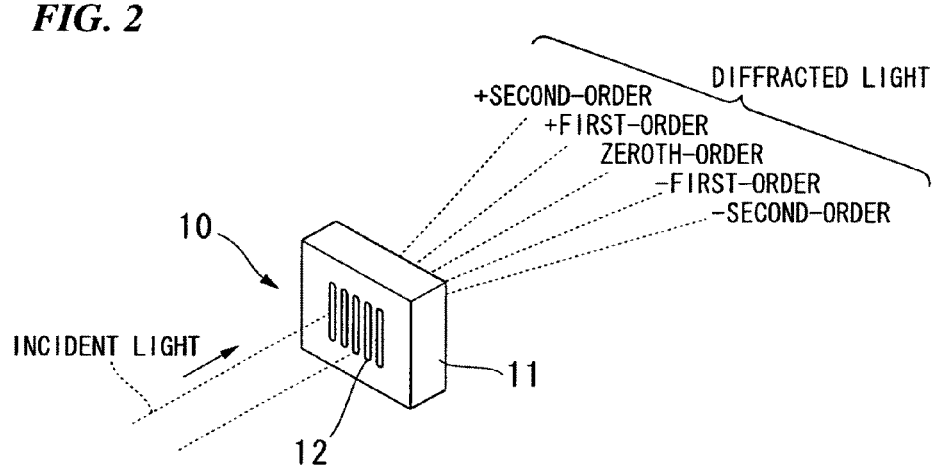
FIG. 2 is a schematic diagram for explaining the case where the structure is used as a diffraction grating.

The structure of the present invention can be used for diffraction grating 10 which separate the incident light into a plurality of diffracted lights as shown in FIG. 2. This diffraction grating 10 have a structure in which a plurality of straight-line shaped cavities 12 are arranged by forming a row two dimensionally with a constant interval inside a parallel plate-shaped transparent material 11. Due to this, this diffraction grating may function as a Bragg diffraction grating or a phase diffraction grating. Between the two, Bragg diffraction grating can also function as a photonic crystal; i.e. a filter selectively transmitting and/or reflecting light with specific wavelength. Moreover, by providing with period modulation or a cavity gap in part of periodic arrangement of the photonic crystals, it is also possible to function as optical waveguide, optical resonator, or optical delaying device. On the other hand, the phase diffraction grating can also function as a Fresnel lens. For example, it is made by first calculate kinoform by a computer and plurally arranging a circular cavity, which is formed by connecting single cavities, or a single cavity, which is like the case in the abovementioned non-patent document 9, in concentrical and periodical manners.

Figure 3A:
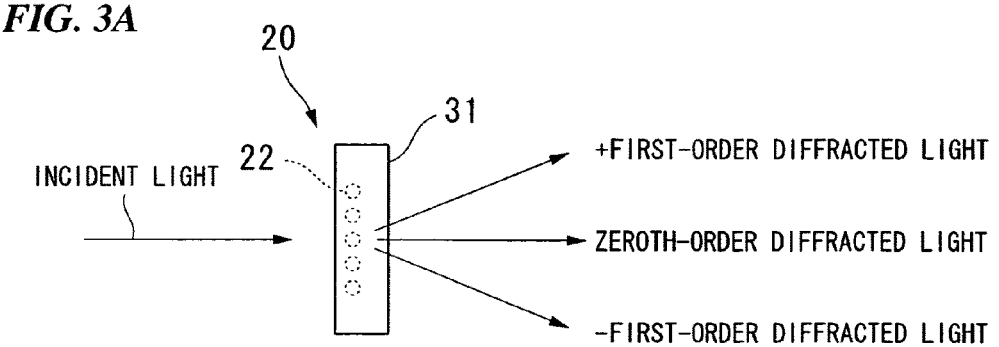
FIG. 3A is a schematic diagram for explaining the case where the structure is used as an optical filter.
Figure 3B:
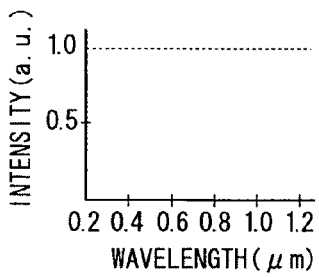
FIG. 3B is a graph for explaining the case where the structure is used as an optical filter.
Figure 3C:
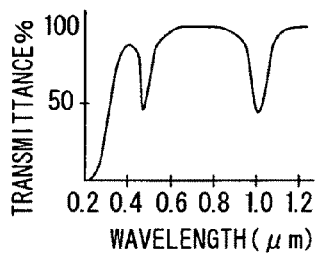
FIG. 3C is another graph for explaining the case where the structure is used as an optical filter.
Figure 3D:
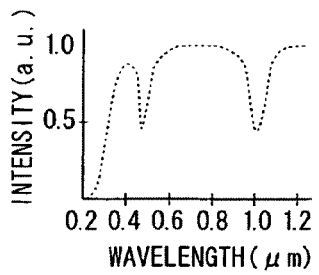
FIG. 3D is yet another graph for explaining the case where the structure is used as an optical filter.

The structure of the present invention may be used as an optical filter 20 as shown in FIG. 3A. This optical filter 20 may function as a color filter, phase filter, polarizing filter, optical attenuation filter, light-scattering filter, light-diffusion filter, or the like due to cavities 22 formed inside transparent material 21. For example, in the case of a color filter, transparent material 21 itself absorbs a portion of light with specific wavelengths and the internal cavities 22 function as a diffraction grating. In this case, when the incident light with a spectrum intensity as shown in FIG. 3B enter the optical filter 20, which exhibits a transmittance shown by the transmittance curve in FIG. 3C, the incident light is diffracted by the diffraction grating formed from cavities 22 and thereby outputting the output light (diffracted light) which has a spectrum intensity as shown in FIG. 3D.

Figure 4:
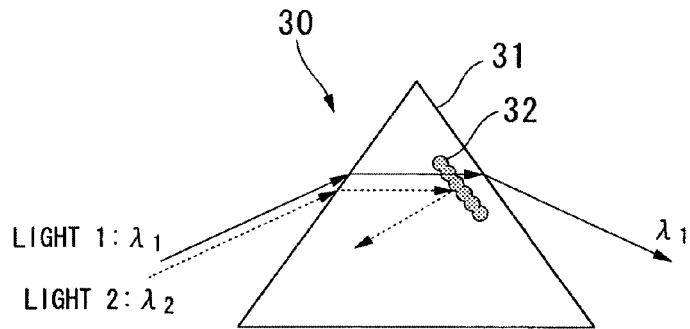
FIG. 4 is a schematic diagram for explaining the case where the structure is used as a prism.

The structure of the present invention may be used as a prism 30 as shown in FIG. 4. This prism 30 passes the light with an arbitrary wavelength λ1 and reflect the light with a wavelength λ2, which is different from the wavelength λ1, by cavities 32 formed inside the transparent material 31, which is almost triangular. The prism 30 with such function may be prepared by making Bragg diffraction grating or photonic crystals which is constituted by periodically arranging cavities 32 three-dimensionally with a period interval whose length ranges from the similar length of the wavelength λ2 of the regulated light to approximately two-fold thereof. Moreover, the structure of the present invention may also be used as a lens.

As described above, the structure of the present invention may have a cavity, which is formed inside the transparent material, with a function as an optical component. Moreover, the structure of the present invention may also be used as an optical component which is combined with functions originating from shapes and physical properties of transparent materials themselves. For example, when the transparent material itself is a lens, it is possible to make a lens with function of a diffraction grating by forming a cavity inside this lens. Moreover, it is also possible to adjust aberration by cavity without changing the design of lens shape. Accordingly, it is possible to reduce the number of component in the optical system where a plurality of optical components with different functions are required, to downsize the entire apparatus, and also to reduce the manufacturing cost.

Figure 5:
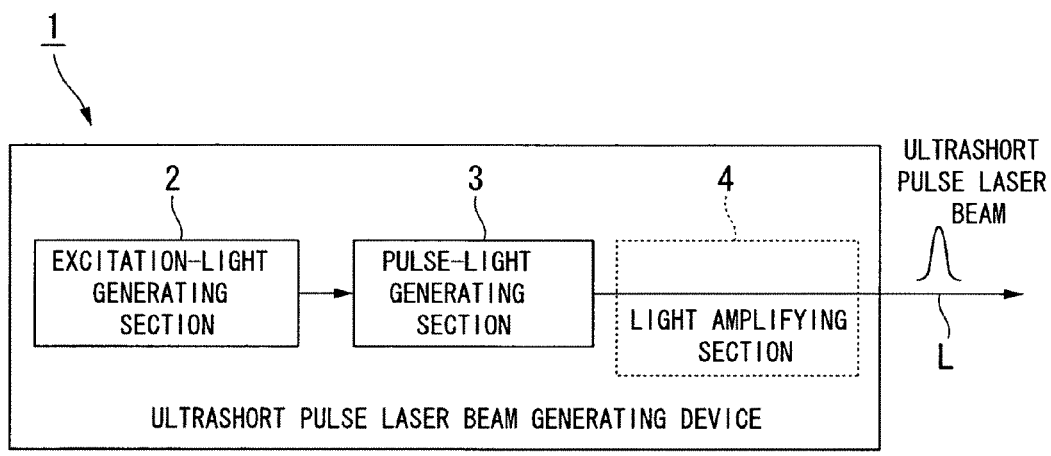
FIG. 5 is a schematic diagram showing a configuration of a pulse laser beam generating apparatus.
Figure 6:
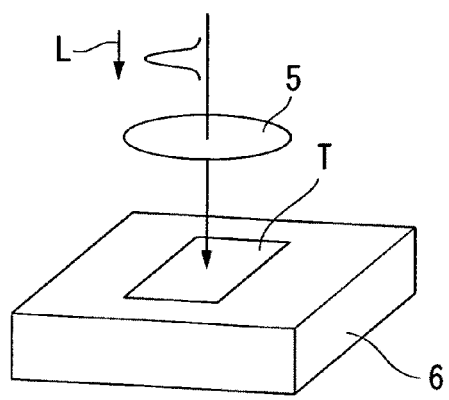
FIG. 6 is a schematic diagram for explaining the irradiation method of pulse laser beam.

The pulse laser beam generating device, which is used when manufacturing the structure of the present invention, is schematically shown in FIG. 5. This pulse laser beam generating device 1 is configured by having an excitation light-generating section 2, pulse-light generating section 3, and light amplifying section 4. As for light amplifying section 4, it can be used where needed. The wavelength of the pulse laser beam L, which is outputted from this device 1 in a femto-second order ($10^{-12}$ to $10^{-15}$), may be changed within a range between 100 and 2000 nm, for example. Accordingly, it is preferable to set the wavelength of the pulse laser beam to the wavelength which transmit the aforementioned transparent materials, for example, 800 nm, as a central wavelength. This pulse laser beam L is introduced to an exposure/irradiation optical system due to reflection by a mirror (not shown) or the like, condensed by a light-condensing member (a lens or a condensing mirror), and irradiated onto the transparent material T, which is placed on the stage 6. This stage 6 can be scanned in the XYZ directions by electric control.

The pulse laser beam used here is preferably one whose pulse energy is compressed within an extremely short region in terms of time and space. In other words, the pulse laser beam is preferably ultrashort pulse laser beam whose pulse width at the light-condensed focal point is 10 pico ($10 \times 10^{-12}$) seconds or less. The upper limit of the pulse width is preferably 500 femto seconds or less especially when the transparent material is glass and more preferably 300 femto seconds or less and most preferably 200 femto seconds or less. In the present invention, the cavity which is formed inside the aforementioned transparent material is differentiated from the cracks whose generation is attributable to the conversion of the energy of pulse laser beam to heat. Accordingly, the occurrence of cracks due to the heat effect can be suppressed within this range of pulse width. On the other hand, the lower limit of the pulse width is preferably 15 femto seconds or more and more preferably 20 femto seconds or more and most preferably 30 femto seconds or more. When the pulse width is lower than the lower limit, the effect of pulse dispersion (spectral extent) increases. Note that even when a pulse laser with the abovementioned pulse width is used, there is a case where small cracks occur depending on the mechanical strength (e.g. elastic modulus or hardness) of the transparent material. Accordingly, the maximum length of the cracks occurring in the periphery of one cavity is preferably 10 μm or less and more preferably 5 μm or less and most preferably 3 μm or less. When the size of the cracks exceed this range, cracks would be present throughout the entire periodical structure where the abovementioned cavities are periodically arranged and it becomes difficult to obtain satisfactory structures.

Although repetition frequency (pulse frequency of a laser beam per second) of the pulse laser beam used at the time of manufacturing the structure of the present invention is not particularly limited, it is possible to improve processing throughput by setting to high repetition frequency (e.g. preferably 80 MHz or less) and accelerating the traveling speed of focal point.

The wavelength of the pulse laser beam used at the time of manufacturing the structure of the present invention may be selected appropriately depending on the transmittance of the transparent material. The shorter the wavelength is, it becomes more possible to lower the diffraction limit of the condensing spot and finite processing becomes possible. Accordingly, the central wavelength of pulse laser beam is preferably 2 μm or less and more preferably 1 μm or less and most preferably 800 nm or less.

Power density of pulse laser beam at the focal position is preferably $1 \times 10^8$ W/cm$^2$ or more and more preferably $1 \times 10^9$ W/cm$^2$ or more and most preferably $1 \times 10^{10}$ W/cm$^2$ or more. Moreover, when the transparent material is glass, spot diameter at the time of forming internal cavities is 10 μm or less and more preferably 5 μm or less and most preferably 2 μm or less. In addition, although power density required for cavity formation varies depending on the material processability by laser or the state of light-condensation and thus, the upper limit thereof is not limited uniformly, in the case of glass, for example, the upper limit is preferably $1 \times 10^{17}$ W/cm$^2$ or less when the above-described spot diameter is 2 μm or less and more preferably $1 \times 10^{16}$ W/cm$^2$ or less and most preferably $5 \times 10^{15}$ W/cm$^2$ or less. The occurrence of damages or distortions in the periphery of cavities can thereby be suppressed.

Figure 7:
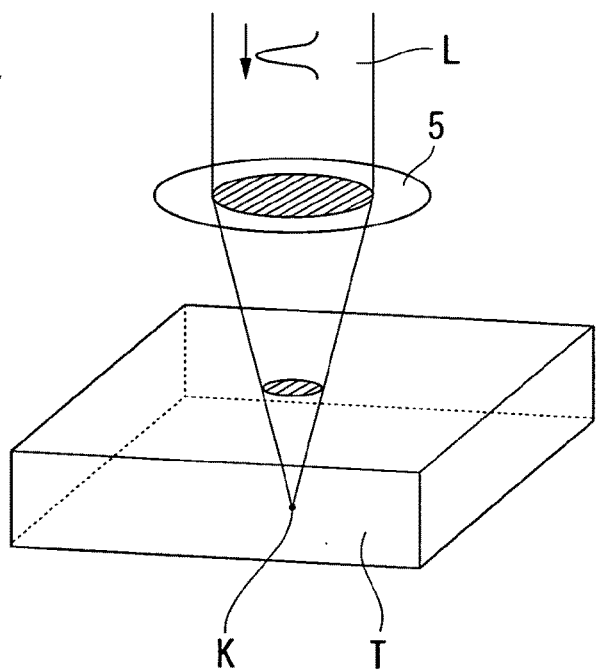
FIG. 7 is a schematic diagram for explaining a method for forming one continuous cavity by one pulse laser beam.

As shown in FIG. 7, manufacturing of the structure of the present invention is based on a method which forms one continuous cavity K at one light-condensed focal point by condensing one pulse laser beam L to one point inside transparent material T by lens 5. The shape of this cavity K is highly dependent on light-condensing state of lens 5 and furthermore, the light-condensing state of lens 5 varies in response to laser power, shape, refractive index, or processing position (depth) of materials, or the like.

The pulse laser beam used for manufacturing the structure of the present invention may go through a light controlling process, which is changeable arbitrarily and is inserted within an optical path before the pulse enters transparent material. Examples of such processes include a process for separating one pulse laser beam into a plurality of beams by use of a beam splitter, diffraction grating, microlens array or the like; a process for extending beam diameter by use of a beam expander; a process for chirping pulse width by use of a diffractive optical device; and a process for controlling the phase, beam profile, amplitude, polarization, or wavelength of pulse laser beam or the like, by use of a phase plate, ND filter, polarizing plate, wavelength conversion element, or the like. Additionally, separated pulse laser beams may further be controlled individually.

Figure 8:
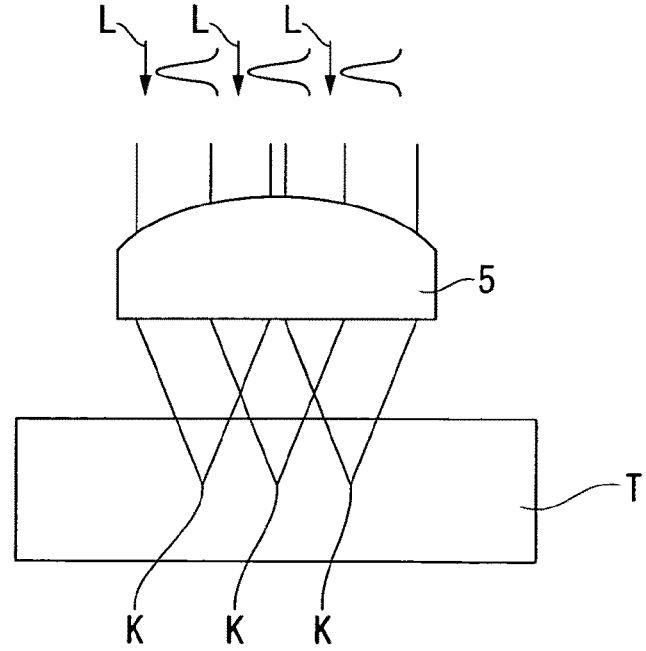
FIG. 8 is a schematic diagram for explaining a method for simultaneously forming a plurality of cavities by a plurality of pulse laser beams.

As shown in FIG. 8, when manufacturing the structure of the present invention, it is possible to collectively form a plurality of cavities K by condensing a plurality of pulse laser beams L to a plurality of positions, which are separate from each other, inside the transparent material T by the sole lens 5. The plurality of pulse laser beams described above may be those outputted from a plurality of devices or those generated by plurally separating one pulse laser beam, which is outputted from one device. A plurality of cavities K can thereby be formed collectively in a large area and processing of even larger areas can be carried out by using the abovementioned stage 6 concomitantly.

Figure 9:
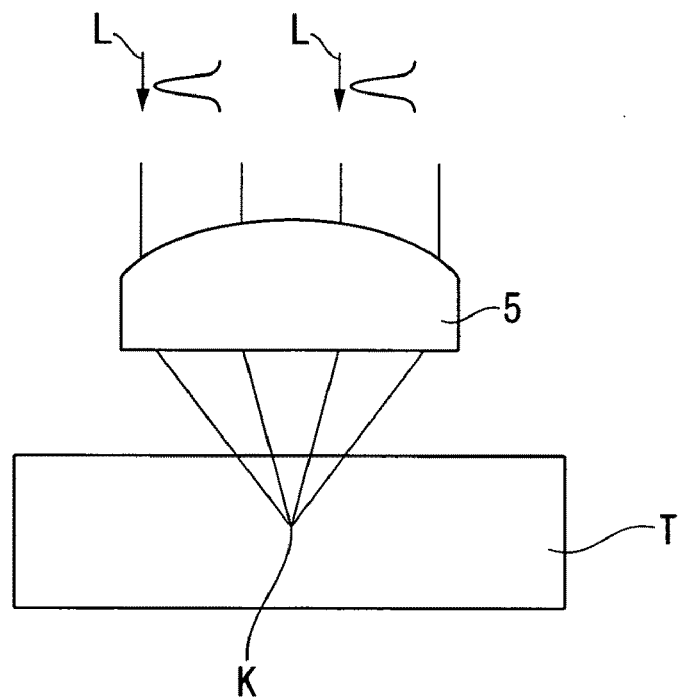
FIG. 9 is a schematic diagram for explaining a method to form one cavity by a plurality of pulse laser beams.

As shown in FIG. 9, when manufacturing the structure of the present invention, it is also possible to form one cavity K by temporarily and spatially synchronizing a plurality of pulse laser beams L, which pass different light paths, to condense to one point inside the transparent material T by lens 5.

The means to condense the above-described pulse laser beam inside transparent material is not particularly limited as long as the cavity can be formed and normal lenses, prisms, reflection mirrors, condensing mirrors, or the like may be used. Moreover, it does not need to be a single lens when using a lens, and it is also possible to form a cavity while adjusting or correcting spherical aberration, coma, astigmatism, curvature of field, distortion, chromatic aberration, or the like by combined use of a plurality of lenses like the case found in microscope objective lens.

As a method to adjust changes in light-condensing state accompanying changes in processing depth of transparent material, for example, it is possible to use a method to condense and irradiate light by correcting for changes in numerical aperture (N.A.), which is following changes in focal-point depth, due to combined use of microscope objective lens with a long operating distance and hemispherical lens as disclosed in the above patent document 6.

In addition, when fine and highly accurate processing is desired, the smaller the diameter of light-condensed spot, the better whereas the higher numerical aperture is, the better. Accordingly, light-condensing magnification of the light-condensing optical system is preferably 40-fold or more and more preferably 60-fold or more and most preferably 100-fold or more. Moreover, numerical aperture is preferably 0.5 or more and more preferably 0.8 or more and most preferably 1.0 or more.

Figure 10:
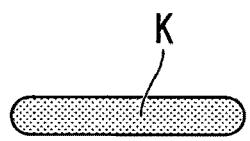
FIG. 10 is a schematic diagram showing a linear cavity.
Figure 11:
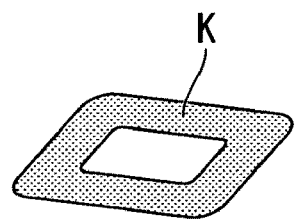
FIG. 11 is a schematic diagram showing a polygonal cavity.
Figure 12:
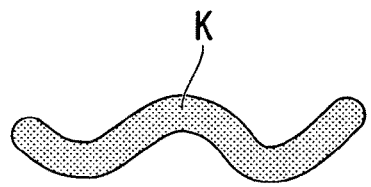
FIG. 12 is a schematic diagram showing a curved cavity.
Figure 13:
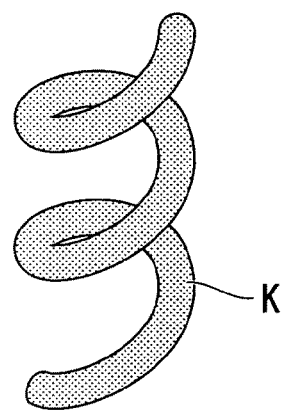
FIG. 13 is a schematic diagram showing a spiral cavity.
Figure 14:
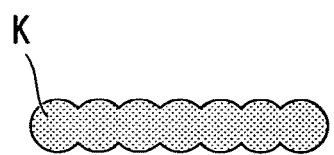
FIG. 14 is a schematic diagram showing a bead cavity.

In the structure of the present invention, the shape of cavities formed inside the transparent material can be made into arbitrary shapes by adjusting light-condensing state, relative movement between those of focal point and transparent material, or the like. Specifically, it is possible to form cavity K into shapes such as a liner shape shown in FIG. 10, a polygonal shape shown in FIG. 11, a curved shape shown in FIG. 12, a spiral shape shown in FIG. 13, and a bead shape shown in FIG. 14, by fixing transparent material onto a stage, which is scannable in X—, Y—, and Z directions, and scan the focal point of pulse laser beam; by placing a galvanometer mirror just before the light-condensing lens to change the light path of pulse laser beam; or by connecting a plurality of cavities, each of which is formed at one light-condensed focal point. Furthermore, shapes of cavities K can be made into more complex shapes by arranging them two- or three dimensionally.

Figure 15:
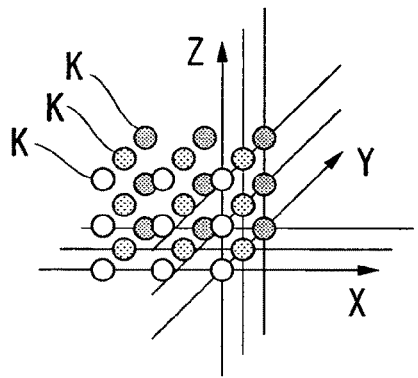
FIG. 15 is a schematic diagram showing one example of cavities arranged three-dimensionally in a form of cubic lattice.
Figure 16:
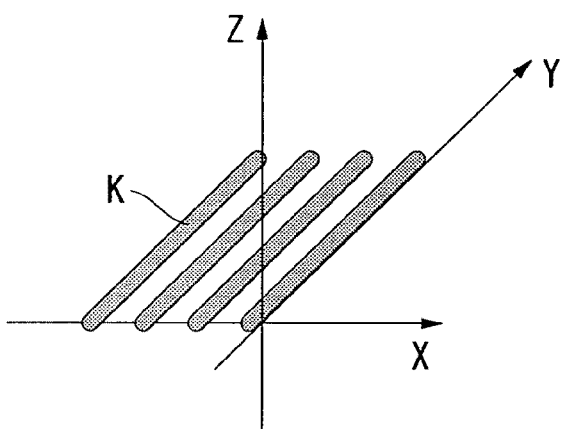
FIG. 16 is a schematic diagram showing one example of linear cavities which are arranged three-dimensionally.
Figure 17:
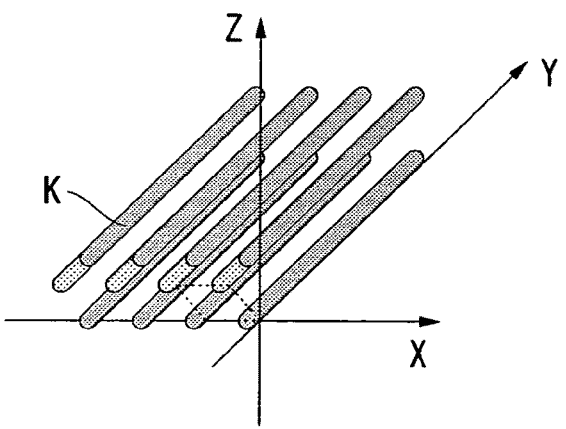
FIG. 17 is a schematic diagram showing another example of linear cavities which are arranged three-dimensionally.
Figure 18:
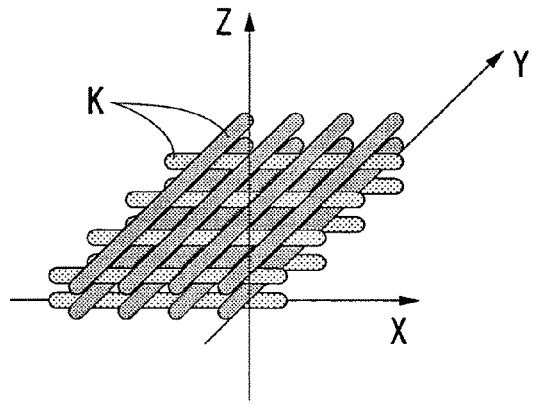
FIG. 18 is a schematic diagram showing yet another example of linear cavities which are arranged three-dimensionally.

As for the arrangement of cavity, as shown in FIG. 15 for example, it is possible to arrange cavity K, which is almost spherical, three dimensionally in a cubic lattice-like manner. In addition, it is also possible to arrange cavity K three-dimensionally in other ways like those found in crystal structures which may be found in naturally occurring crystals; e.g. tetragonal lattice, face-centered cubic lattice, body-centered cubic lattice, diamond lattice, or the like. On the other hand, as shown in FIG. 16, it is also possible to arrange a linear cavity K two-dimensionally at a fixed interval. Moreover, it is also possible to arrange cavity K as shown in FIG. 17, by laminating three-dimensionally in a triangular-lattice manner where the two-dimensional arrangement shown in FIG. 16 is deviated by half cycle per one layer, or in a so-called log-pile manner where the two-dimensional arrangement shown in FIG. 16 is squarely laminated per one layer.

Figure 19:
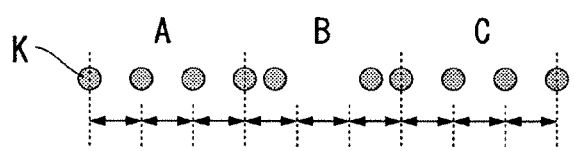
FIG. 19 is a schematic diagram showing one example of period modulation which is introduced into a part of periodic arrangement of cavities.
Figure 20:
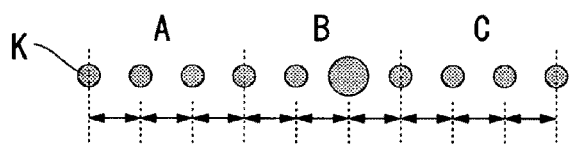
FIG. 20 is a schematic diagram showing another example of period modulation which is introduced into a part of periodic arrangement of cavities.

Moreover, among the above-described periodical arrangements, it is also possible to modulate or delete a part of periods or the like. For example, as shown in FIG. 19, it is also possible to make into a structure in which among the regions A, B, and C where cavity K is periodically arranged in a line, the regions A and C have the same periodic interval whereas that of the region B is modulated. Moreover, as shown in FIG.

Figure 21:
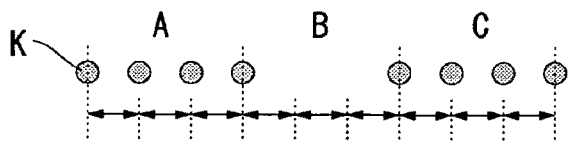
FIG. 21 is a schematic diagram showing yet another example of period modulation which is introduced into a part of periodic arrangement of cavities.

20, it is also possible to make into a structure where the regions A to C are arranged with the same periodic interval and a part of cavity K', which is arranged in region B, is made larger than other cavity K. Additionally, as shown in FIG. 21, it is also possible to make into a structure where the regions A and C are arranged with the same periodic interval whereas a part of cavity K in the region B is deleted.

When the cavity arranged periodically functions as a photonic crystal, by introducing abovementioned periodic modulation or deletion, it is possible to function the photonic crystal as an optical waveguide in an anti-waveguide manner, in other words, a waveguide which selectively guides light to a part where cavity is deleted; or optical components such as optical resonator and optical delaying device.

If distortion, coloring, or cracks occur in the periphery of cavities, the function of the structure may deteriorate when used as the abovementioned optical components. In this case, these defects may be alleviated or removed by heating said structure during or after the irradiation by pulse laser beam. Although heating means is not particularly limited, a heater, an infrared lamp, laser or the like may be used, for example. Moreover, by controlling heat treatment conditions of the aforementioned heating means, it is also possible to adjust refractive index of the region in the vicinity of cavity, to change cavity shape, or to eliminate cavity.

Figure 22:
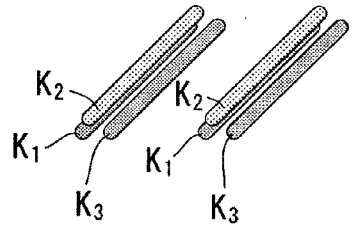
Figure 23:
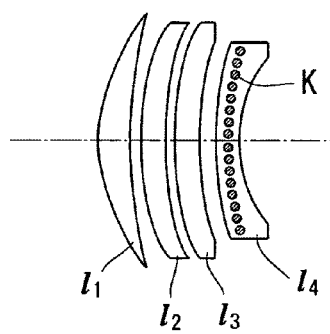
FIG. 23 is a schematic diagram of one example where the structure of the present invention is used for lens.
Figure 24:
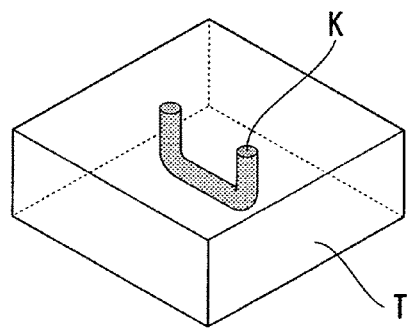
FIG. 24 is a schematic diagram showing one example of a structure having a cavity, which is connected to the outside.
Figure 25:
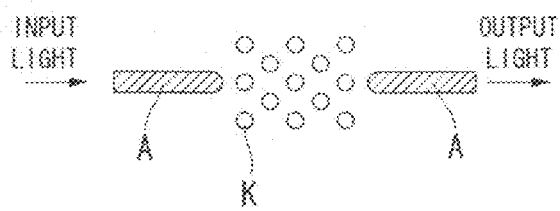
FIG. 25 is a schematic diagram showing one example of a structure having a cavity and highly densified region.

Examples of other structures include a structure which has an internal optical waveguide, where the light is guided to a region which is surrounded by a plurality of linear or curved cavities, as shown in FIG. 22. Specifically, in the structure shown in FIG. 22, light L is guided to the center of a region which is surrounded by three linear cavities K1, K2, and K3 that are arranged so that respective cavities are positioned in each apex of an equilateral triangle. Additionally, the entire waveguide or a part thereof may be curved. In addition, examples of other structures include a structure where cavity K is formed inside lens 14, as shown in FIG. 23 and lens 14 as such may be used by incorporating into the optical system constituted from a plurality of lenses 11, 12, and 13 such as an image pickup device. Additionally, examples of other structures include a structure where internal cavity K thereof is connected outside as shown in FIG. 24. In the case of this structure, it is also possible to introduce gases or liquids to cavity K. Moreover, examples of other structures include a structure which has an internal refractive index-changing region A caused by cavity K and densification. In other words, the structure may be one with a refractive index-changing region (high refractive-index region) A as an optical waveguide which is formed by a laser whose power is not high enough to result in cavity formation and having an internal structure which guide the light to cavity K which is arranged periodically. By combining such internal structures, it is also possible to make a structure having an internal integrated optical circuit.

EXAMPLES

Hereinafter, the effect of the present invention is made clearer using Examples. Transparent materials used in Examples 1 to 24 and Comparative Examples 1 to 7 are glasses formed of respective compositions shown in Tables 1 and 2 and all glasses are parallel plates with a thickness of 0.3 mm and both sides thereof are optically polished. Moreover, all glasses have internal transmittance of 90% or more across a 1-mm thickness for 800 nm, which is the wavelength of a laser. Additionally, dissolution temperature of glasses is between 1000 and 1550° C. and heat treatment was carried out where after dissolving in air using a platinum- or quartz crucible, glasses are cooled slowly at annealing temperatures of respective glasses. For oxide glasses, salts such as oxides, nitrates, and sulfates which contain a cation that constitutes glass or the like are used as raw materials. On the other hand, for the glass with a composition where oxygen in the oxide glass is partially substituted by fluorine, fluoride salts are used concomitantly with the abovementioned raw materials. In addition, since these glasses are all manufactured in air, it is possible that a considerable amount of fluorine components therein may be volatilized. Accordingly, the amount of fluorine shown in Tables 1 and 2 does not necessarily represent the total amount of fluorine contained in each glass. Note that the composition shown in Tables 1 and 2 is describing the included amount when converted to oxides. Moreover, the composition shown in Tables 1 and 2 is derived by first converting all raw materials to oxides and then adding the amount of fluorine separately.

TABLE 1

|  | Example 1 | Example 2 | Example 3 | Example 4 | Example 5 | Example 6 | Example 7 | Example 8 |
|---|---|---|---|---|---|---|---|---|
| $SiO_2$ | 62.0 | 67.8 | 50.1 | 28.2 | 17.1 | 25.9 | 17.2 |  |
| $B_2O_3$ | 20.7 | 11.9 | 13.1 | 14.7 | 49.6 | 25.9 | 17.2 | 10.9 |
| $P_2O_5$ |  |  |  |  |  | 38.3 | 25.5 | 34.9 |
| $GeO_2$ |  | 12.9 | 28.6 | 47.9 |  |  |  |  |
| $Al_2O_3$ | 0.4 | 1.9 | 2.0 | 2.3 |  | 3.3 | 13.3 | 2.9 |
| $Li_2O$ |  |  |  |  |  | 1.7 | 6.7 |  |
| $Na_2O$ |  | 4.3 | 4.8 | 5.4 | 9.3 | 1.7 | 6.7 |  |
| $K_2O$ | 16.8 | 0.3 | 0.3 | 0.4 |  | 1.7 | 6.7 |  |
| MgO |  |  |  |  |  |  |  | 7.8 |
| CaO |  | 1.0 | 1.1 | 1.2 | 24.0 |  |  | 12.9 |
| SrO |  |  |  |  |  |  |  |  |
| BaO |  |  |  |  |  |  |  | 29.5 |
| $TiO_2$ | 0.0 |  |  |  |  |  |  |  |
| $Nb_2O_5$ |  |  |  |  |  | 1.7 | 6.7 |  |
| $ZrO_2$ |  |  |  |  |  |  |  |  |
| ZnO |  |  |  |  |  |  |  | 1.2 |
| $Sb_2O_3$ |  |  |  |  |  | 0.02 | 0.03 | 0.03 | 0.04 |
| F | 27.2 |  |  |  |  |  |  |  |
| Total | 127.2 | 100.0 | 100.0 | 100.0 | 100.0 | 100.0 | 100.0 | 100.0 |
| Cavity | present | present | present | present | present | present | present | present |
| Refractive index ($n_d$) | 1.487 | 1.507 | 1.521 | 1.555 | 1.575 | 1.530 | 1.582 | 1.603 |
| Abbe number ($v_d$) | 70.2 | 63.4 | 57.2 | 51.9 | 63.2 | 60.7 | 42.8 | 65.5 |
| Specific gravity | 2.46 | 2.56 | 2.69 | 3.01 | 2.59 | 2.42 | 2.41 | 3.51 |

TABLE 1-continued

|  |  |  |  |  |  |  |  |  |
|---|---|---|---|---|---|---|---|---|
| Processing threshold value (nJ/pulse) *1 | 15 | 27 | 7 | 5 | 10 | 7 | 4 | 7 |
| Processing energy (nJ/pulse) | 45 | 51 | 28 | 25 | 40 | 21 | 12 | 35 |

|  | Example 9 | Example 10 | Example 11 | Example 12 | Example 13 | Example 14 | Example 15 | Example 16 |
|---|---|---|---|---|---|---|---|---|
| $SiO_2$ | 2.9 | 3.2 | 27.0 | 1.2 |  | 67.2 |  |  |
| $B_2O_3$ | 5.5 | 6.1 | 27.0 | 1.0 | 8.9 | 7.2 | 52.2 | 57.2 |
| $P_2O_5$ | 53.3 | 59.9 | 40.0 | 25.1 | 10.0 |  |  |  |
| $GeO_2$ |  |  |  |  |  |  |  |  |
| $Al_2O_3$ | 0.3 | 0.2 | 2.0 |  | 21.2 | 2.5 |  |  |
| $Li_2O$ |  |  | 1.0 |  |  |  |  |  |
| $Na_2O$ | 0.8 | 0.7 | 1.0 | 4.6 |  | 7.1 |  |  |
| $K_2O$ |  |  | 1.0 |  |  | 4.7 |  |  |
| MgO |  |  |  |  | 7.7 |  |  |  |
| CaO | 37.1 | 29.9 |  |  | 30.5 | 11.2 | 37.4 | 32.4 |
| SrO |  |  |  |  | 21.8 |  |  |  |
| BaO |  |  |  | 0.9 |  |  |  |  |
| $TiO_2$ |  |  |  | 41.2 |  |  | 8.5 | 8.5 |
| $Nb_2O_5$ |  |  | 1.0 | 25.9 |  |  | 1.9 | 1.9 |
| $ZrO_2$ |  |  |  |  |  |  |  |  |
| ZnO |  |  |  |  |  |  |  |  |
| $Sb_2O_3$ |  |  | 0.03 | 0.04 |  | 0.02 | 0.02 | 0.02 |
| F |  | 31.9 |  |  | 244.3 |  |  |  |
| Total | 99.9 | 131.9 | 100.0 | 100.0 | 344.3 | 100.0 | 100.0 | 100.0 |
| Cavity | present | present | present | Present | present | present | present | present |
| Refractive index ($n_d$) | 1.528 | 1.528 | 1.519 | 2.027 | 1.456 | 1.527 | 1.694 | 1.678 |
| Abbe number ($v_d$) | 67.1 | 67.8 | 64.0 | 16.4 | 90.3 | 61.9 | 41.6 | 41.7 |
| Specific gravity | 2.58 | 2.55 | 2.43 | 3.57 | 3.55 | 2.52 | 2.87 | 2.79 |
| Processing threshold value (nJ/pulse) *1 | 12 | 11 | 18 | 1 | 14 | 8 | 14 | 12 |
| Processing energy (nJ/pulse) | 48 | 44 | 72 | 3(*2) | 56 | 220 | 82 | 61 |

|  | Example 17 | Example 18 | Example 19 | Example 20 | Example 21 | Example 22 | Example 23 | Example 24 |
|---|---|---|---|---|---|---|---|---|
| $SiO_2$ |  |  | 3.4 | 3.4 | 3.4 | 3.4 |  |  |
| $B_2O_3$ | 62.2 |  | 6.4 | 6.4 | 6.4 | 6.4 |  |  |
| $P_2O_5$ |  | 66.6 | 45.4 | 52.4 | 59.4 | 66.4 | 50.0 | 50.0 |
| $GeO_2$ |  |  |  |  |  |  |  |  |
| $Al_2O_3$ |  | 33.3 | 0.4 | 0.4 | 0.4 | 0.4 |  |  |
| $Li_2O$ |  |  |  |  |  |  |  |  |
| $Na_2O$ |  |  | 0.9 | 0.9 | 0.9 | 0.9 | 30.0 | 10.0 |
| $K_2O$ |  |  |  |  |  |  |  |  |
| MgO |  |  |  |  |  |  |  |  |
| CaO | 27.4 |  | 43.5 | 36.5 | 29.5 | 22.5 |  |  |
| SrO |  |  |  |  |  |  |  |  |
| BaO |  |  |  |  |  |  | 20.0 | 40.0 |
| $TiO_2$ | 8.5 |  |  |  |  |  |  |  |
| $Nb_2O_5$ | 1.9 |  |  |  |  |  |  |  |
| $ZrO_2$ |  |  |  |  |  |  |  |  |
| ZnO |  |  |  |  |  |  |  |  |
| $Sb_2O_3$ | 0.02 | 0.04 | 0.03 | 0.03 | 0.03 | 0.03 |  |  |
| F |  |  |  |  |  |  |  |  |
| Total | 100.0 | 100.0 | 100.0 | 100.0 | 100.0 | 100.0 | 100.0 | 100.0 |
| Cavity | present | present | present | present | present | present | present | present |
| Refractive index ($n_d$) | 1.661 | 1.510 | 1.549 | 1.534 | 1.526 | 1.519 | 1.526 | 1.565 |
| Abbe number ($v_d$) | 41.2 | 69.9 | 66.6 | 67.0 | 67.8 | 67.3 | 65.9 | 64.5 |
| Specific gravity | 2.69 | 2.51 | 2.66 | 2.57 | 2.53 | 2.49 | 2.96 | 3.38 |
| Processing threshold value (nJ/pulse) *1 | 12 | 13 | 11 | 11 | 11 | 11 | 8 | 8 |
| Processing energy (nJ/pulse) | 82 | 96 | 147 | 108 | 153 | 115 | 300 | 300 |

*1: Threshold value at a depth of 50 μm from the surface except *2.
*2: is a threshold value at a depth of 30 μm from the surface.

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| $SiO_2$ | 100.0 | 63.8 | 73.7 | 72.4 | 66.3 | 74.5 | 69.4 |
| $B_2O_3$ |  | 14.1 | 14.8 |  |  |  | 2.9 |
| $P_2O_5$ |  |  |  | 0.8 |  |  |  |
| $GeO_2$ |  |  |  |  |  |  |  |
| $Al_2O_3$ |  | 4.3 |  | 4.0 |  |  |  |
| $Li_2O$ |  | 12.3 |  | 19.1 |  |  | 6.8 |
| $Na_2O$ |  | 0.2 | 4.8 |  | 10.5 | 9.0 | 3.9 |
| $K_2O$ |  | 4.7 | 5.3 | 1.2 | 7.1 | 4.7 | 7.0 |
| MgO |  |  |  | 1.2 |  |  |  |
| CaO |  |  |  |  |  |  |  |
| SrO |  |  |  |  |  |  |  |
| BaO |  |  | 0.7 |  |  |  | 5.8 |
| $TiO_2$ |  | 0.1 | 0.0 |  | 16.1 | 11.7 | 0.1 |
| $Nb_2O_5$ |  |  |  |  |  |  |  |
| $ZrO_2$ |  |  |  | 1.1 |  |  |  |
| ZnO |  | 0.5 | 0.8 | 0.4 |  |  | 4.1 |
| $Sb_2O_3$ |  | 0.04 | 0.01 | 0.04 | 0.02 | 0.02 | 0.05 |
| F |  |  |  |  |  |  |  |
| Total | 100.0 | 100.0 | 100.0 | 100.0 | 100.0 | 100.0 | 100.0 |
| Cavity | Present | Absent | Absent | Absent | Absent | Absent | Absent |
| Refractive index ($n_d$) | 1.458 | 1.516 | 1.516 | 1.518 | 1.603 | 1.568 | 1.540 |
| Abbe number ($v_d$) | 67.7 | 64.1 | 64.1 | 61.5 | 38.0 | 42.3 | 59.5 |
| Specific gravity | 2.20 | 2.23 | 2.52 | 2.38 | 2.63 | 2.53 | 2.75 |
| Processing threshold value (nJ/pulse) *1 | 11 | 11 | 8 | 12 | 10 | 8 | 9 |
| Processing energy (nJ/pulse) | 33 | 110 | 80 | 120 | 100 | 80 | 90 |

Figure 26:
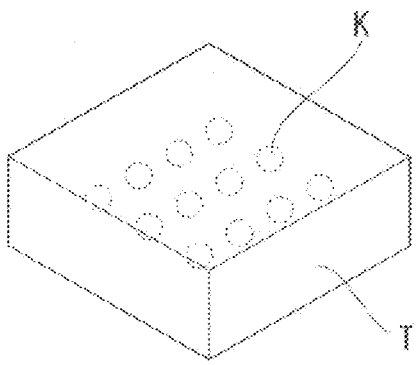
FIG. 26 is a schematic diagram showing one example of a structure whose cavities are arranged two-dimensionally.

Firstly, in a case where a structure having a two-dimensionally random cavity K inside each transparent material T is made as shown in FIG. 26 using each transparent material of Examples 1 to 24 and Comparative Examples 1 to 7, the presence of said cavities is confirmed. Specifically, a pulse laser beam with a beam diameter of 5 mm, pulse width of about 150 fs, central wavelength of 800 nm, and a repetition frequency of 10 Hz and which is outputted from structure manufacturing device (Hurricane manufactured by Spectra-Phisics Inc.; Ti:$Al_2O_3$ laser equipped with a regenerative amplification function) is introduced to an inverted microscope IX-71 manufactured by Nikon Corporation) and by use of an apochromat oil immersion objective (light-condensing magnification: 100-fold, N.A.=1.35, manufactured by Olympus Corporation) and condensed and irradiated in a diameter of 2 μm or less at a position which is about 50 μm deep from the surface of each transparent material. On the other hand, each transparent material is fixed onto an electric stage (ProscanH101 manufactured by Prior Scientific, Inc.) and a structure having the abovementioned cavity inside the transparent material is made by moving the transparent material relatively in XY direction at 300 μm per second.

Moreover, processing energy shown in Tables 1 and 2 is a power of a laser used measured by a power meter (818-UV/CM manufactured by Newport Corporation) and is an average energy value of one pulse of a pulse laser beam at a focal point. The laser power at this focal point is obtained from a relative value between the power before entering the optical system and the power outputted from microscope objective lens by a method shown in abovementioned non-patent document 10 by taking loss in the optical system into consideration. The power outputted from microscope objective lens is measured using a super-hemispherical solid immersion lens ($n_d$=1.845, diameter=1 mm, Weierestrass type) on a borosilicate glass ($n_d$=1.517). This laser power is specifically made between about 1.5-fold to 35-fold of processing threshold value in consideration of effects of damages or distortions in the periphery of the cavity formed inside glass. Additionally, the processing threshold value refers to a value of laser power where changes in refractive index may be confirmed visually when observed using the abovementioned objective lens.

Figure 27:
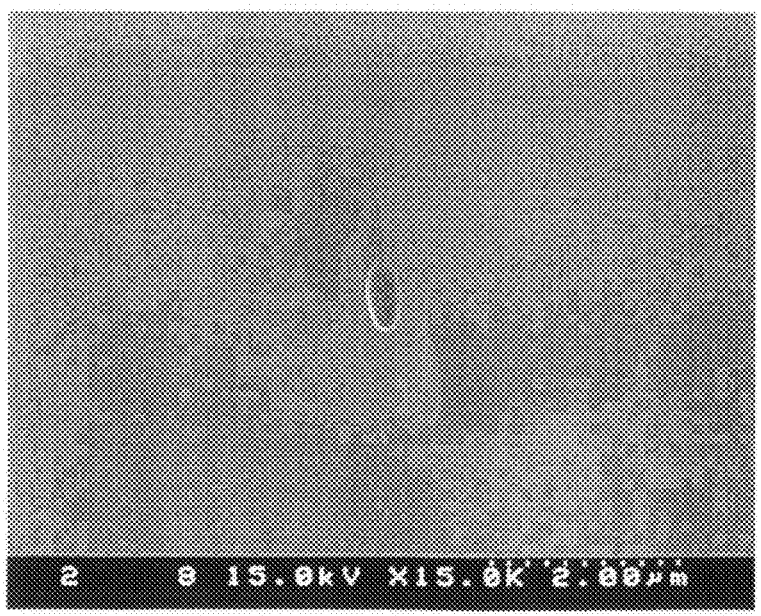
FIG. 27 is a scanning electron micrograph showing a cavity formed in the structure using silica glass of Comparative Example 1.
Figure 28:
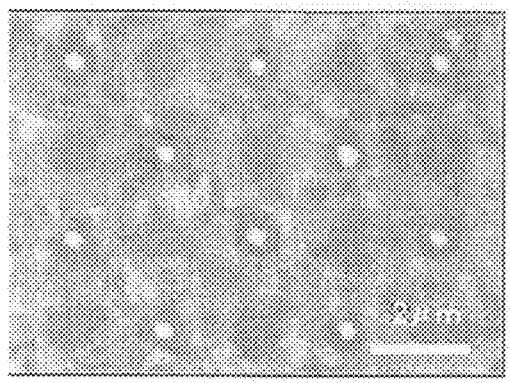
FIG. 28 is a photograph taken by an optical microscope showing a cavity which is formed in the structure using glass of Example 4.

The presence of cavities formed inside the structure can be judged since an image with a high contrast and which is diffusive is observed if the refractive index-changing region is observed using a light microscope when the cavity is present. However, in the present example, the presence of cavities formed inside the structure is judged from the presence of cavity trace (a dent originated from cavity) appearing in broken-out section by use of a scanning electron microscope (JSM-6700F manufactured by JEOL Ltd.) by breaking glass after manufacturing. For example, the cavity formed inside a synthetic quartz glass (ViOSIL-SQ manufactured by Shin-Etsu Chemical Co., Ltd.), which is a Comparative Example 1, a dent as shown in FIG. 27 is observed in broken-out section. As shown in Tables 1 and 2, formation of satisfactory cavities was confirmed in all structures of Examples 1 to 24. Moreover, this cavity had a maximum length of 1 μm or less in a direction perpendicular to an incident direction of pulse laser beam. On the other hand, in the structures of Comparative Examples 2, 4, 5, 6 and 7, the presence of cavity traces could not be confirmed at 300 nJ/pulse or less in the abovementioned structure-manufacturing optical system and furthermore, it was clear that cavity was not formed due to low contrast of the refractive-index changing region observed by a light microscope. On the other hand, in Comparative Example 3, although cavity formation is confirmed when 220 nJ/pulse is inputted, 70 mol % or more $SiO_2$ is contained and temperature for dissolution process is high and refractive index is low which is nd=1.516 (<1.53). Next, by use of glass (nd=1.555) of Example 4, the structure with a plurality of cavities periodically arranged inside this glass was made. Specifically, this glass is fixed onto a piezo stage (PZ48E manufactured by Physik Instrumente (PI) GmbH & Co. KG) set pulse width to about 150 fs, central wavelength to 800 nm, repetition frequency to 10 Hz and by use of the same microscope objective lens used in Example 1 and a pulse beam with a pulse energy of 21.2 nJ/pulse, which is about 4-fold of that of threshold value, is condensed and irradiated at a position which is 50 μm deep from the surface. The structure in which cavities are laminated (total of 17 layers) into face-centered cubic lattice (lattice spacing of 4 μm per unit) manner as shown in FIG. 28 was obtained in the end by relatively moving a stage, which is program-controlled so that one cavity is formed by one pulse.

Figure 29:
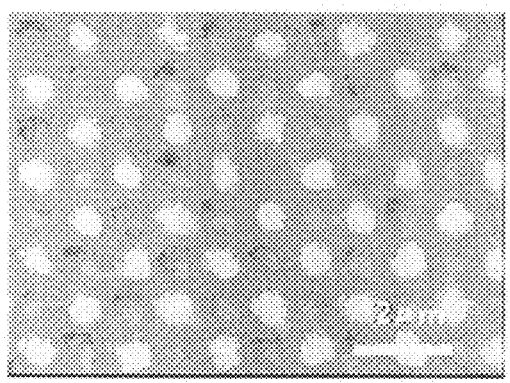
FIG. 29 is a photograph taken by an optical microscope showing a cavity which is formed in the structure using glass of Example 12.

Next, by use of glass ($n_d$=2.002) of Example 12, the structure with a plurality of cavities which are periodically arranged inside this glass was made. Specifically, this glass is fixed onto the aforementioned piezo stage and set pulse width to about 150 fs, central wavelength to 800 nm, repetition frequency to 10 Hz and by use of the same microscope objective lens used in Example 1 and a pulse beam with a pulse energy of 3.2 nJ/pulse, which is about 3-fold of that of threshold value, is condensed and irradiated at a position which is 30 μm deep from the surface. The structure in which cavities are laminated (total of 17 layers) into face-centered cubic lattice (lattice spacing of 2 μm per unit) manner at a position, which is about 30 to 60 μm deep from the plane of incidence as shown in FIG. 29 was obtained by relatively moving a stage, which is program-controlled so that one cavity is formed by one pulse.

Figure 30:
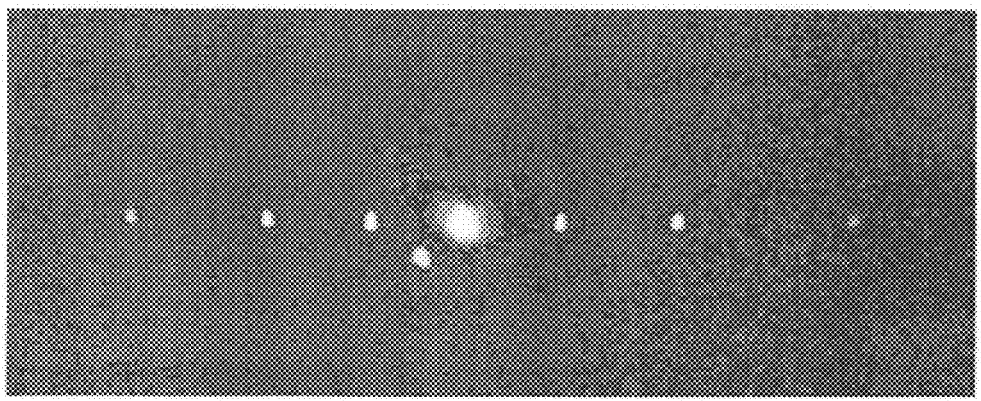
FIG. 30 is a projected image of a structure using glass of Example 12 by the diffracted light of an He—Ne laser beam which is incident thereon.

Next, by use of glass ($n_d$=2.002) of Example 12, the structure with a plurality of cavities which are periodically arranged two-dimensionally inside this glass was made. Specifically, this glass is fixed onto the aforementioned piezo stage and set pulse width to about 150 fs, central wavelength to 800 nm, repetition frequency to 10 Hz and by use of the same microscope objective lens used in Example 1 and a pulse beam with a pulse energy of 8.0 nJ/pulse, which is about 8-fold of that of threshold value, is condensed and irradiated at a position which is 30 μm deep from the surface. The structure in which a plurality of linear cavities with a line width of about 1 μm are arranged at a 3-μm interval in an area range of 300 μm×300 μm at a position, which is about 30 μm deep from the plane of incidence as shown in FIG. 30 was obtained by relatively moving a stage at 200 μm/sec which is program-controlled so that one cavity is formed by one pulse. Moreover, when an He—Ne laser (wavelength of 633 nm) with a beam diameter of 2 mm was irradiated onto the above-mentioned processing region in this structure using a lens with a focal length of about 7 cm, outgoing light (diffracted light) is projected onto a screen set in a position which is about 6 μm distant from the structure, as shown in FIG. 30. Accordingly it was confirmed that the structure may function as a diffraction grating.

INDUSTRIAL APPLICABILITY

The structure and manufacturing method thereof of the present invention can be used for optical components such as diffraction grating. Moreover, the present invention can also be used as a structure which may function as a path for liquids, gases, or the like, or to encapsulate liquids, gases, or the like by connecting the internal cavities to outside. In addition, it is also possible to improve optical functionality by introducing photosensitive materials therein or to make three-dimensional electrical circuits by introducing conductive materials therein.

While the preferred embodiments of the present invention have been described using specific terms, such description is for illustrative purposes only, and it is to be understood that changes and variations may be made without departing from the spirit or scope of the appended claims.

The invention claimed is:
1. A structure comprising:
a transparent material; and
a cavity which is formed inside said transparent material by a cavity-formation operation,
wherein the cavity has a refractive index lower than the transparent material, and
wherein the refractive index of said transparent material at d line (wavelength of 587.56 nm) is $n_d \geq 1.3$.

2. A structure comprising:
a transparent material; and
an internal cavity which is formed by irradiating said transparent material with a pulse laser beam having a pulse width of $10 \times 10^{-12}$ seconds or less,
the internal cavity has a refractive index lower than the transparent material, and
wherein the refractive index of said transparent material at d line is $n_d \geq 1.3$.

3. The structure according to claim 1, wherein:
the transparent material contains at least one or more components selected from the group consisting of $SiO_2$, $GeO_2$, $B_2O_3$, and $P_2O_5$; and
a total amount of the components selected from said group is 40% or more in terms of mol %.

4. The structure according to claim 1, wherein the transparent material is glass with an $n_d \geq 1.3$, with a proviso that glass with an $n_d < 1.53$ and which contains 70% or more $SiO_2$ is excluded.

5. The structure according to claim 3,
wherein the transparent material is glass with an $n_d \geq 1.3$ and which contains 10% or more $SiO_2$ in terms of mol %, and
wherein a proportion of said $SiO_2$ is higher than that of other respective components contained therein.

6. The structure according to claim 5, wherein the transparent material contains either one of $B_2O_3$ at less than 40% in terms of mol %, and $P_2O_5$ at less than 40% in terms of mol %, or both.

7. The structure according to claim 3,
wherein the transparent material is glass with an $n_d \geq 1.3$ and which contains a total amount of 10% or more of $SiO_2$ and $GeO_2$ in terms of mol %; and
wherein a proportion of the total amount of said $SiO_2$ and $GeO_2$ is higher than that of other respective components contained therein and the ratio of said two components therein is $GeO_2/SiO_2 > 0.1$ in terms of mol ratio.

8. The structure according to claim 7, wherein the transparent material contains either one of $B_2O_3$ at less than 40% in terms of mol %, and $P_2O_5$ at less than 40% in terms of mol %, or both.

9. The structure according to claim 3, wherein
the transparent material is glass with an $n_d \geq 1.3$ and which contains 10% or more $B_2O_3$ in terms of mol %; and
a proportion of said $B_2O_3$ is higher than that of other respective components contained therein.

10. The structure according to claim 9, wherein the transparent material contains either one of $SiO_2$ at less than 40% in terms of mol % and $P_2O_5$ at less than 40% in terms of mol %, or both.

11. The structure according to claim 3, wherein
the transparent material is glass with an $n_d \geq 1.3$ and which contains 10% or more $P_2O_5$ in terms of mol %; and
a proportion of said $P_2O_5$ is higher than that of other respective components contained therein.

12. The structure according to claim 11, wherein the transparent material contains either one of $SiO_2$ at less than 40% in terms of mol %, and $B_2O_3$ at less than 40% in terms of mol %, or both.

13. The structure according to claim 1, wherein
the transparent material is glass with an $n_d \geq 1.3$ and which contains at least one or more components selected from a group consisting of $SiO_2$, $GeO_2$, $B_2O_3$, and $P_2O_5$; and
total amount of the components selected from said group is more than 0% and less than 40% in terms of mol %.

14. The structure according to claims 13, wherein
the transparent material contains at least one or more components selected from a group consisting of $Sc_2O_3$, $TiO_2$, $V_2O_5$, $Y_2O_3$, $ZrO_2$, and $Nb_2O_5$; and
total amount of the components selected from said group is 40% or more in terms of mol %.

15. The structure according to claim 2, wherein among the components contained in the glass, oxygen in the oxide components is partially substituted by fluorine.

16. The structure according to claim 2, wherein the transparent material has a transmittance of 10% or more across a 1-mm thickness for a wavelength of the pulse laser beam.

17. The structure according to claim 2, wherein power density of the pulse laser beam at a focal position is $1 \times 10^8$ $W/cm^2$ or more.

18. The structure according to claim 2, wherein a maximum length of the cavity in a direction perpendicular to an incident direction of the pulse laser beam is 2 μm or less.

19. The structure according to claim 1, wherein the cavity has a linear or a curved shape.

20. The structure according to claim 1, wherein a plurality of said cavities are periodically arranged in a two- or three-dimensional positional relationship.

21. A lens comprising:
a transparent material; and
a cavity which is formed inside said transparent material by cavity-formation means,
wherein the cavity has a refractive index lower than the transparent material, and
wherein the refractive index of said transparent material at d line (wavelength of 587.56 nm) is $n_d \geq 1.3$.

22. A prism comprising:
a transparent material; and
a cavity which is formed inside said transparent material by cavity-formation means,
wherein the cavity has a refractive index lower than the transparent material,
wherein refractive index of said transparent material at d line (wavelength of 587.56 nm) is $n_d \geq 1.3$.

23. A diffraction grating comprising:
a transparent material; and
a cavity which is formed inside said transparent material by cavity-formation means,
wherein the cavity has a refractive index lower than the transparent material,
wherein refractive index of said transparent material at d line (wavelength of 587.56 nm) is $n_d \geq 1.3$.

24. An optical filter comprising:
a transparent material; and
a cavity which is formed inside said transparent material by cavity-formation means,
wherein the cavity has a refractive index lower than the transparent material,
wherein refractive index of said transparent material at d line (wavelength of 587.56 nm) is $n_d \geq 1.3$.

25. The structure according to claim 20, wherein said plurality of cavities are simultaneously formed inside the transparent material by irradiating said transparent material with a plurality of pulse laser beams.

* * * * *